US012437716B2

(12) United States Patent
Yamamoto

(10) Patent No.: US 12,437,716 B2
(45) Date of Patent: Oct. 7, 2025

(54) LIGHT EMITTING DEVICE, DISPLAY DEVICE, PHOTOELECTRIC CONVERSION DEVICE, ELECTRONIC APPARATUS, AND WEARABLE DEVICE

(71) Applicant: CANON KABUSHIKI KAISHA, Tokyo (JP)

(72) Inventor: Tetsuro Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/520,895

(22) Filed: Nov. 28, 2023

(65) Prior Publication Data

US 2024/0185788 A1 Jun. 6, 2024

(30) Foreign Application Priority Data

Dec. 6, 2022 (JP) ................................ 2022-195014
Jun. 12, 2023 (JP) ................................ 2023-096470

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0819* (2013.01); *G09G 2300/0842* (2013.01); *G09G 2300/0861* (2013.01); *G09G 2310/08* (2013.01); *G09G 2320/02* (2013.01)

(58) Field of Classification Search
CPC ............... G09G 3/3233; G09G 3/3266; G09G 2300/0819; G09G 2300/0842; G09G 2300/0861; G09G 2310/08; G09G 2320/02
See application file for complete search history.

(56) References Cited

U.S. PATENT DOCUMENTS

2006/0061560 A1* 3/2006 Yamashita ........... G09G 3/3233 345/204
2008/0198103 A1* 8/2008 Toyomura .............. G09G 3/325 345/77

(Continued)

FOREIGN PATENT DOCUMENTS

JP 2010-145579 A 7/2010
JP 2016-029492 A 3/2016

(Continued)

*Primary Examiner* — William Boddie
*Assistant Examiner* — Saifeldin E Elnafia
(74) *Attorney, Agent, or Firm* — Venable LLP

(57) ABSTRACT

A light emitting device including a pixel is provided. The pixel includes a light emitting element, a driving transistor connected to the light emitting element, a control transistor arranged between the driving transistor and a supply line and a write transistor arranged between a control terminal of the driving transistor and a signal line. One frame period includes a correction period during which the write transistor is rendered conductive and a reference signal is written in the control terminal, a write period during which the write transistor is rendered conductive and a luminance signal is written in the control terminal, and a light emission period. The control transistor is rendered conductive during a conductive state of the write transistor in the correction period, and is rendered conductive after the correction period and before the write period.

23 Claims, 19 Drawing Sheets

(56) References Cited

U.S. PATENT DOCUMENTS

| | | | | |
|---|---|---|---|---|
| 2009/0244050 | A1* | 10/2009 | Yamamoto | G09G 3/3266<br>345/212 |
| 2010/0149152 | A1* | 6/2010 | Yamamoto | G09G 3/3233<br>345/76 |
| 2018/0342207 | A1* | 11/2018 | Tsuboi | G09G 3/3233 |
| 2019/0019458 | A1* | 1/2019 | Teraguchi | H10K 59/123 |
| 2023/0043411 | A1 | 2/2023 | Igarashi | |
| 2023/0047907 | A1 | 2/2023 | Seto | |

FOREIGN PATENT DOCUMENTS

| | | | |
|---|---|---|---|
| JP | 2020-085959 | A | 6/2020 |
| JP | 2021-128194 | A | 9/2021 |

* cited by examiner

LIGHT EMITTING DEVICE, DISPLAY DEVICE, PHOTOELECTRIC CONVERSION DEVICE, ELECTRONIC APPARATUS, AND WEARABLE DEVICE

This application claims the benefit of Japanese Patent Application No. 2022-195014, filed Dec. 6, 2022 and Japanese Patent Application No. 2023-096470, filed Jun. 12, 2023, which are hereby incorporated by reference herein in their entirety.

BACKGROUND OF THE INVENTION

Field of the Invention

The present invention relates to a light emitting device, a display device, a photoelectric conversion device, an electronic apparatus, and a wearable device.

Description of the Related Art

Interest in a light emitting device using a self-light emitting element such as an organic electroluminescence (EL) element has increased. Japanese Patent Laid-Open No. 2010-145579 describes a display device using an organic EL element.

SUMMARY OF THE INVENTION

When the pixel size decreases as the resolution of a light emitting device increases, the size of an element such as a transistor arranged in the pixel decreases. Further, the distance between the element and a wiring pattern can be decreased. As the element such as the transistor is reduced in size and the distance between the element and the wiring pattern is decreased, the influence of a parasitic capacitance between the element and the wiring pattern increases. If the influence of the parasitic capacitance increases, a change in potential of the wiring pattern is propagated via the parasitic capacitance, and the gate potential of the transistor arranged in the pixel is changed. This can cause deterioration in image quality.

Some embodiments of the present invention provide a technique advantageous in suppressing deterioration in image quality.

According to some embodiments, a light emitting device in which a pixel is arranged, the pixel including a light emitting element, a driving transistor having a first main terminal connected to the light emitting element and configured to supply, to the light emitting element, a current corresponding to a luminance signal, a light emission control transistor arranged between a second main terminal of the driving transistor and a supply line that supplies a first potential and configured to control light emission of the light emitting element, a write transistor arranged between a control terminal of the driving transistor and a signal line to which the luminance signal and a reference signal are supplied, and a capacitive element arranged between the second main terminal and the control terminal, wherein one frame period includes a correction period during which the reference signal is supplied to the signal line, the write transistor is rendered conductive, and the reference signal is written in the control terminal, a write period after the correction period, during which the luminance signal is supplied to the signal line, the write transistor is rendered conductive, and the luminance signal is written in the control terminal, and a light emission period after the write period, during which the light emission control transistor changes from a non-conductive state to a conductive state, and the light emitting element emits light corresponding to the luminance signal, and the light emission control transistor is rendered conductive during a conductive state of the write transistor in the correction period, and the light emission control transistor is rendered conductive after an end of the correction period and before a start of the write period, is provided.

Further features of the present invention will become apparent from the following description of exemplary embodiments (with reference to the attached drawings).

DESCRIPTION OF THE EMBODIMENTS

Figure 1:
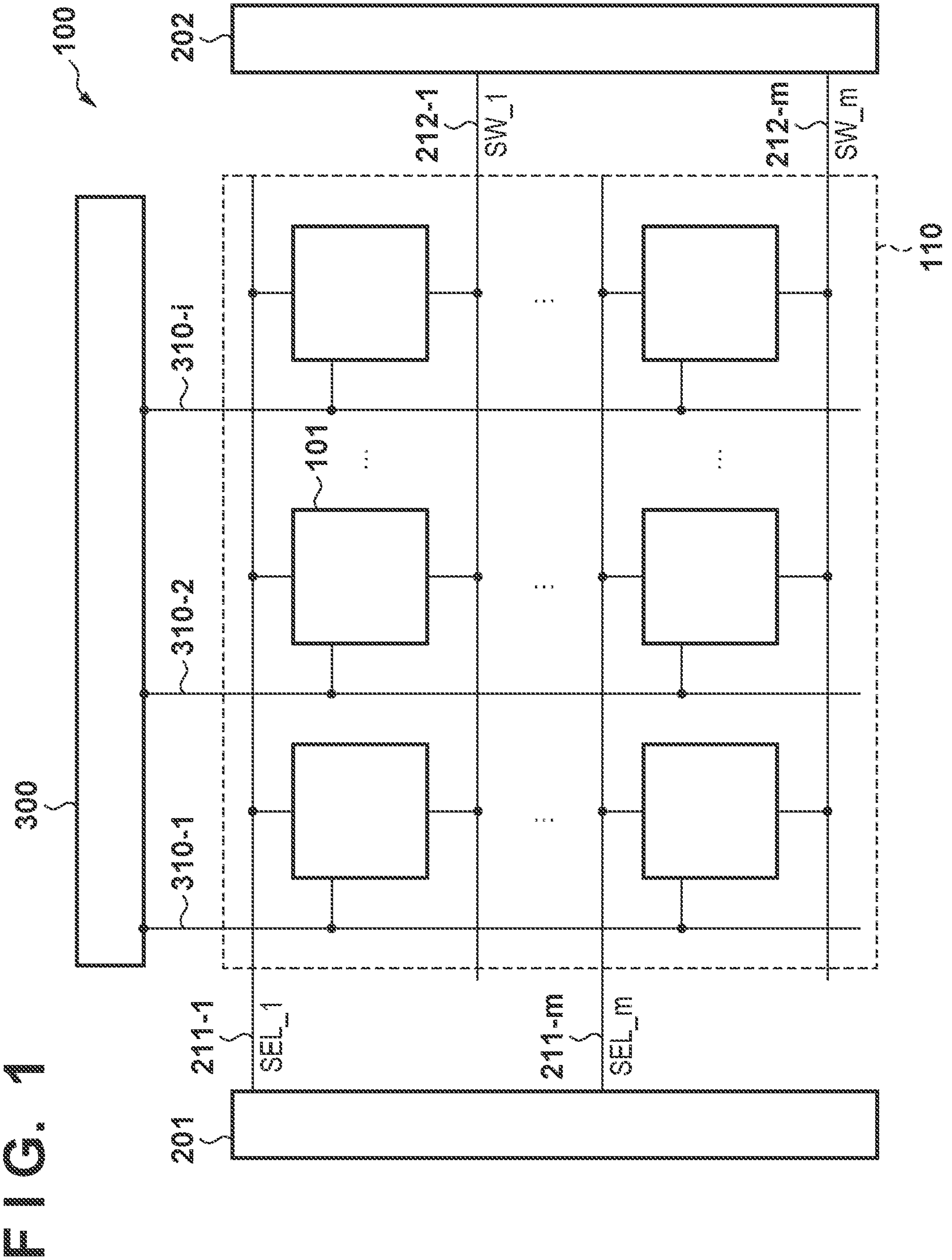
FIG. 1 is a view showing an example of the arrangement of a light emitting device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A light emitting device according to an embodiment of the present disclosure will be described with reference to FIGS. 1 to 15. FIG. 1 is a schematic view showing an example of the arrangement of a light emitting device 100 according to this embodiment. The light emitting device 100 is formed by including a pixel array 110 and driving circuits arranged on the periphery of the pixel array 110. In the pixel array 110, a plurality of pixels 101 are arranged in a two-dimensional array so as to form a plurality of rows and a plurality of columns.

As the driving circuits for driving the pixels 101, a scanning drive system including a write scanning circuit 201 and a light emission driving scanning circuit 202, and a signal supply system including a signal output circuit 300 are provided. In the arrangement shown in FIG. 1, the write scanning circuit 201 is arranged on the left side of the pixel array 110, and the light emission driving scanning circuit 202 is arranged on the right side of the pixel array 110. However, the arrangement of the write scanning circuit 201 and the light emission driving scanning circuit 202 is not limited to this layout arrangement. For example, the arrangement relationship between the write scanning circuit 201 and the light emission driving scanning circuit 202 may be reversed, or the write scanning circuit 201 and the light emission driving scanning circuit 202 may be arranged on one side of the pixel array 110. Alternatively, for example, a pair of the write scanning circuit 201 and the light emission driving scanning circuit 202 may be arranged on each of the left and right sides of the pixel array 110.

Here, one pixel will be described. In general, one pixel is formed by a plurality of sub-pixels, and the sub-pixel can correspond to the pixel 101 shown in FIG. 1. More specifically, one pixel may be formed by, for example, three sub-pixels (pixels 101) including a sub-pixel that emits red (R) light, a sub-pixel that emits green (G) light, and a sub-pixel that emits blue (B) light. However, one pixel is not limited to a combination of the sub-pixels of the three primary colors of RGB. One pixel may be formed by adding one or a plurality of color sub-pixels to the sub-pixels of the three primary colors. For example, a sub-pixel that emits white (W) light to improve luminance may form one pixel together with the sub-pixels of the three primary colors. Alternatively, for example, at least one sub-pixel that emits complementary color light to extend the color reproduction range may form one pixel together with the sub-pixels of the three primary colors. Further, for example, in a case in which the light emitting device 100 may be a monochrome display device or the like, one pixel may be formed from one pixel 101. The arrangement of the sub-pixels (pixels 101) arranged in one pixel can be selected, as appropriate, in accordance with the performance conditions demanded for the light emitting device 100.

In the arrangement shown in FIG. 1, the pixels 101 are arranged in m rows×i columns in the pixel array 110. Scanning lines 211-1 to 211-*m* (also referred to as write scanning lines) and scanning lines 212-1 to 212-*m* (also referred to as light emission driving scanning lines) are arranged for each pixel row in a row direction (the horizontal direction in FIG. 1) with respect to the array of the pixels 101. In addition, signal lines 310-1 to 310-*i* are arranged for each pixel column in a column direction (the vertical direction in FIG. 1).

Each of the scanning lines 211-1 to 211-*m* is connected to an output terminal of the write scanning circuit 201 in a corresponding row. Each of the scanning lines 212-1 to 212-*m* is connected to an output terminal of the light emission driving scanning circuit 202 in a corresponding row. Each of the signal lines 310-1 to 310-*i* is connected to an output terminal of the signal output circuit 300 in a corresponding column. In the following description, when indicating the specific scanning line 211 of the scanning lines 211-1 to 211-*m*, a suffix is added thereto, like the scanning line 211-1. When not discriminating the scanning lines 211, they are expressed simply as the "scanning lines 211". The same applies to other components such as the scanning lines 212 and the signal lines 310.

The pixel array 110 may be formed on, for example, a semiconductor substrate made of silicon or the like. In this case, the driving circuits (including the write scanning circuit 201, the light emission driving scanning circuit 202, and the signal output circuit 300 described above, and the like) for driving the pixels 101 arranged in the pixel array 110 may be arranged on the same substrate, or may be arranged on another substrate. However, the present invention is not limited to this. For example, the pixel array 110 may be formed on an insulating substrate made of glass, a resin, or the like. The insulating substrate may be a plastic substrate. In this case, the pixel array 110 and the driving circuits for driving the pixels 101 arranged in the pixel array 110 may be formed, for example, using a low-temperature polysilicon process in a semiconductor layer of silicon or the like formed on the substrate. Alternatively, for example, the pixel array 110 and the driving circuits for driving the pixels 101 arranged in the pixel array 110 may be formed using an oxide semiconductor process. Alternatively, for example, the pixel array 110 and the driving circuits may be provided on different substrates. In this case, the pixel array 110 may be formed on an insulating substrate, and the driving circuits may be formed on a semiconductor substrate.

The write scanning circuit 201 may be formed by a shift register that sequentially shifts (transfers) a start pulse in synchronization with a clock pulse supplied from a control circuit (not shown) that controls the light emitting device 100. When writing luminance signals (video signals) in the pixels 101 arranged in the pixel array 110, the write scanning circuit 201 sequentially supplies write scanning signals SEL (SEL_1 to SEL_m) to the scanning lines 211 (211-1 to 211-*m*), thereby sequentially scanning the pixels 101 on the row basis (line sequential scanning). Here, the above-described control circuit (not shown) may be arranged in the light emitting device 100. Alternatively, the control circuit may be arranged outside the light emitting device 100 as a control device that supplies signals for controlling the light emitting device 100. In the following description, a control circuit that controls the light emitting device 100 can have an arrangement similar to the arrangement described above.

The light emission driving scanning circuit 202 may be formed by a shift register that sequentially shifts a start pulse in synchronization with a clock pulse supplied from the control circuit (not shown) that controls the light emitting device 100. The light emission driving scanning circuit 202 supplies light emission driving scanning signals SW (SW_1 to SW_m) for performing light emission driving of the pixels 101 to the scanning lines 212 (212-1 to 212-*m*) in synchronization with line sequential scanning by the write scanning circuit 201. The light emission driving scanning signal SW is a signal for controlling light emission or non-light emission of the pixel 101, details of which will be described later.

The signal output circuit 300 outputs a luminance signal Vsig corresponding to luminance information supplied from a signal supply circuit (not shown). As the signal output circuit 300, for example, a known time-division driving circuit arrangement can be used. A time-division driving method is also called a selector method, which assigns a unit (set) of a plurality signal lines to one output terminal of a driver as a signal supply circuit. This is a method of driving each signal line 310 by time-divisionally, sequentially selecting the plurality of signal lines while time-divisionally distributing and supplying, to the selected signal line, luminance signals output in time series for each output terminal of the driver.

By exemplifying the pixel array 110 including red, green, and blue sub-pixels (pixels 101), three pixel columns of red, green, and blue adjacent to each other are set as a unit, and luminance signals of red, green, and blue are supplied in time series from the driver to the signal output circuit 300 during one horizontal period. The signal output circuit 300 is formed by including a multiplexer provided in correspondence with the three pixel columns of red, green, and blue, and the multiplexer time-divisionally, sequentially performs an ON operation, thereby time-divisionally writing luminance signals of red, green, and blue in the corresponding signal lines 310, respectively.

In the above description, the three pixel columns (signal lines) of red, green, and blue are set as a unit. However, the present invention is not limited to this. Adopting the time-division driving method (selector method) has an advantage that the number of outputs of the driver and the number of wirings between the driver and the signal output circuit 300 can be decreased to 1/x of the number of signal lines when x represents the time-division number (x is an integer of 2 or more).

The luminance signal Vsig output from the signal output circuit 300 is written in the pixels 101 of the pixel array 110 via the signal lines 310-1 to 310-*i* on the row basis.

Figure 2:
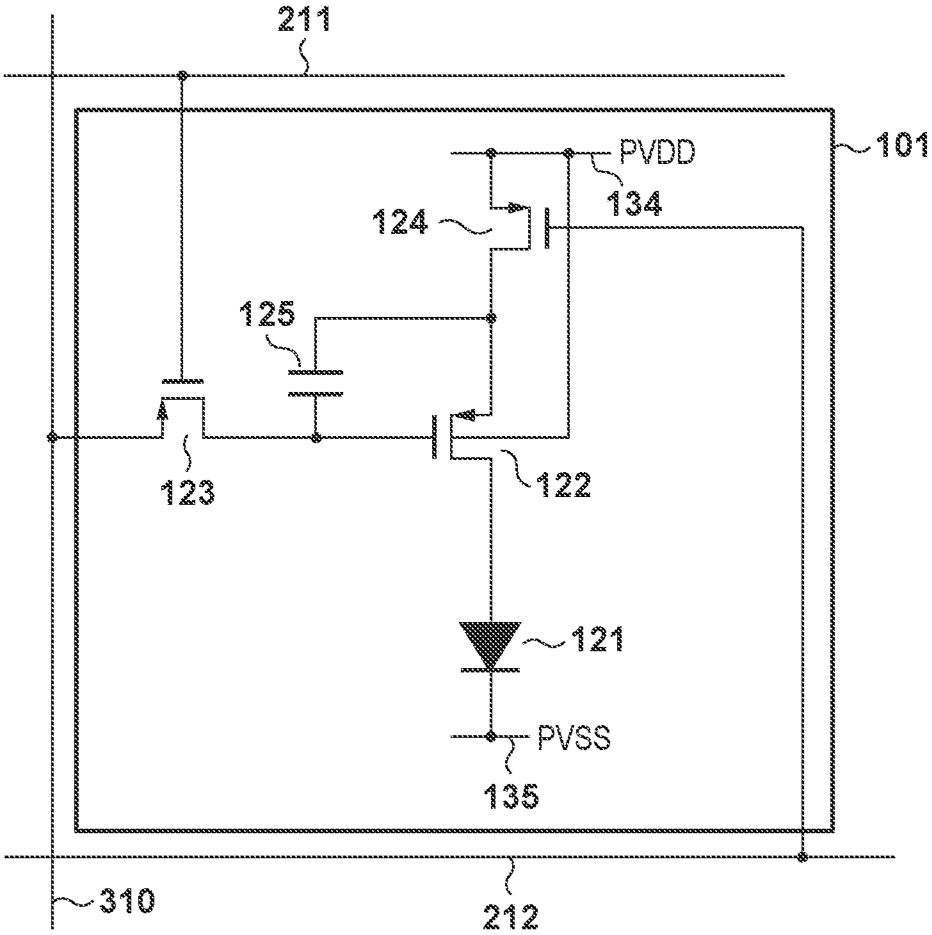
FIG. 2 is a view showing an example of the arrangement of a pixel of the light emitting device shown in FIG. 1.

FIG. 2 is a circuit diagram showing an example of the arrangement of the pixel 101 used for the light emitting device 100 according to this embodiment. As shown in FIG. 2, in the pixel 101, a light emitting element 121 as a current-driven electro-optical element whose light emission luminance changes in accordance with the amount of a flowing current is arranged. The light emitting element 121 may be, for example, an organic electroluminescence (EL) element. In the pixel 101, a driving circuit that drives the light emitting element 121 is arranged.

The driving circuit for driving the light emitting element 121 includes a driving transistor 122, a write transistor 123, a light emission control transistor 124, and a capacitive element 125. The driving transistor 122 has one main terminal (drain electrode) connected to the light emitting element 121, and supplies, to the light emitting element 121, a current corresponding to the luminance signal Vsig. The write transistor 123 is arranged between the control terminal (gate electrode) of the driving transistor 122 and the signal line 310 to which the luminance signal Vsig and a reference signal Vcal (to be described later) are supplied. The write transistor 123 supplies the luminance signal Vsig and the reference signal Vcal to the control terminal of the driving transistor 122. The light emission control transistor 124 is arranged between a supply line 134 for supplying a positive potential PVDD and the other main terminal (source electrode) of the driving transistor 122 different from the main terminal connected to the light emitting element 121, and controls light emission (or non-light emission) of the light emitting element 121. The capacitive element 125 is arranged between the control terminal of the driving transistor 122 and the main terminal (source electrode) of the driving transistor 122 connected to the light emission control transistor 124. A terminal (cathode electrode) not connected to the main terminal (drain electrode) of the driving transistor 122 out of the two terminals of the light emitting element 121 is connected to a supply line 135 for supplying a common potential PVSS in the pixel array 110. The potential PVSS can be a potential lower than the potential PVDD. For example, the potential PVSS may be a negative potential, 0 V, or a potential between 0 V and the potential PVDD. The potential PVSS is only required to have an appropriate potential difference from the potential PVDD in accordance with the characteristics of the light emitting element 121 and the like.

In the arrangement shown in FIG. 2, a p-channel transistor is used as the driving transistor 122. With respect to the driving transistor 122 using the p-channel transistor, p-channel transistors are also used as the write transistor 123 and the light emission control transistor 124. However, a combination of the conductive types of the write transistor 123 and the light emission control transistor 124 is not limited to this. An n-channel transistor may be used for one or both of the write transistor 123 and the light emission control transistor 124.

The driving transistor 122 is series-connected to the light emitting element 121 to supply, to the light emitting element 121, a current (driving current) corresponding to the luminance signal Vsig. One main terminal (drain electrode) of the driving transistor 122 is connected to a terminal (anode electrode) of the light emitting element 121. The back gate terminal of the driving transistor 122 is connected to the supply line 134 for supplying the positive potential PVDD. That is, the back gate terminal of the driving transistor 122 is supplied with the potential PVDD.

Here, the potential supplied to the back gate terminal of the driving transistor 122 need not be the potential PVDD. For example, the back gate terminal of the driving transistor 122 may be connected to a supply line which is different from the supply line 134 and supplies a positive power supply potential VDD. However, in the arrangement of connecting the back gate terminal of the driving transistor 122 to the supply line 134, it is unnecessary to provide, for each pixel 101, supply lines for supplying a plurality of kinds of positive potentials, so that the number of wiring patterns can be reduced. Note that the potential supplied to the back gate terminal of the driving transistor 122 is not limited to those described above. For example, a potential may be externally supplied in a form of a control signal for each row so that the potential input to the back gate terminal of the driving transistor 122 changes between the time of light emission and the time of threshold voltage correction operation to be described later.

In a case in which the driving transistor 122 is formed on a substrate using silicon or a conductor, the potential of the back gate terminal can be controlled by applying a desired potential to the substrate. On the other hand, in a case in which the driving transistor 122 is formed on an insulator such as a glass substrate or a plastic substrate, it is necessary to separately form the back gate terminal using a conductor such as a metal.

The control terminal (gate electrode) of the write transistor 123 is connected to the scanning line 211. In addition, one main terminal of two main terminals (source electrode and drain electrode) of the write transistor 123 is connected to the signal line 310, and the other main terminal is connected to the control terminal (gate electrode) of the driving transistor 122. The control terminal of the write transistor 123 is supplied with the write scanning signal SEL from the write scanning circuit 201 via the scanning line 211.

The control terminal (gate electrode) of the light emission control transistor 124 is connected to the scanning line 212. In addition, one main terminal (source electrode) of two main terminals of the light emission control transistor 124 is connected to the supply line 134 which supplies the potential PVDD, and the other main terminal (drain electrode) is connected to the main terminal (source electrode) of the driving transistor 122 not connected to the light emitting element 121. The control terminal of the light emission control transistor 124 is supplied with the light emission driving scanning signal SW from the light emission driving scanning circuit 202 via the scanning line 212.

During one horizontal period, at least two kinds of signals including the reference signal Vcal and the luminance signal Vsig are supplied to the signal line 310. In one frame period during which one pixel 101 is caused to emit light corresponding to one luminance signal, one horizontal period is a period including a correction period during which the threshold of the driving transistor 122 arranged in one pixel 101 is corrected, and a write period during which the luminance signal Vsig is written. The horizontal period does not include a light emission period during which the light emitting element 121 is caused to emit light corresponding to the luminance signal Vsig written in the pixel 101. The horizontal period will be described later by taking the operation of the light emitting device 100 as an example.

Here, the potential of the reference signal Vcal and the potential of the luminance signal Vsig supplied to the signal line 310 in one horizontal period can have different values. However, depending on the signal value of the luminance signal Vsig, the potential of the reference signal Vcal and the potential of the luminance signal Vsig can be equal to each other.

The write transistor 123 is set in a conductive state in response to the write scanning signal SEL applied from the write scanning circuit 201 to the control terminal via the scanning line 211. This causes the write transistor 123 to sample the potential (luminance signal Vsig) of the luminance signal (video signal) corresponding to luminance information supplied from the signal output circuit 300 via the signal line 310, and write it in the pixel 101. The written luminance signal Vsig is applied to the control terminal of the driving transistor 122 and is also held in the capacitive element 125.

The driving transistor 122 receives supply of a current, via the light emission control transistor 124, from the supply line 134 for supplying the potential PVDD, and executes light emission driving of the light emitting element 121 by current driving. More specifically, the driving transistor 122 supplies, to the light emitting element 121, a driving current of a current value corresponding to the value of the luminance signal Vsig held in the capacitive element 125, thereby current-driving the light emitting element 121 to emit light.

The light emission control transistor 124 is set in a conductive state in response to the light emission driving scanning signal SW applied from the light emission driving scanning circuit 202 to the gate electrode via the scanning line 212, thereby supplying a current from the supply line 134 applied with the potential PVDD to the driving transistor 122. This allows the driving transistor 122 to execute light emission driving of the light emitting element 121, as described above. That is, it can be said that the light emission control transistor 124 has a function as a switch for controlling light emission or non-light emission of the light emitting element 121.

As described above, the switching operation of the light emission control transistor 124 can provide a period (non-light emission period) during which the light emitting element 121 is in a non-light emission state, and control the ratio between the non-light emission period and a light emission period of the light emitting element 121 (so-called duty control). The duty control can reduce afterimage blurring accompanying light emission from the pixel 101 over a period of one frame. Therefore, it is possible to further improve image quality especially when displaying a moving image.

Figure 3:
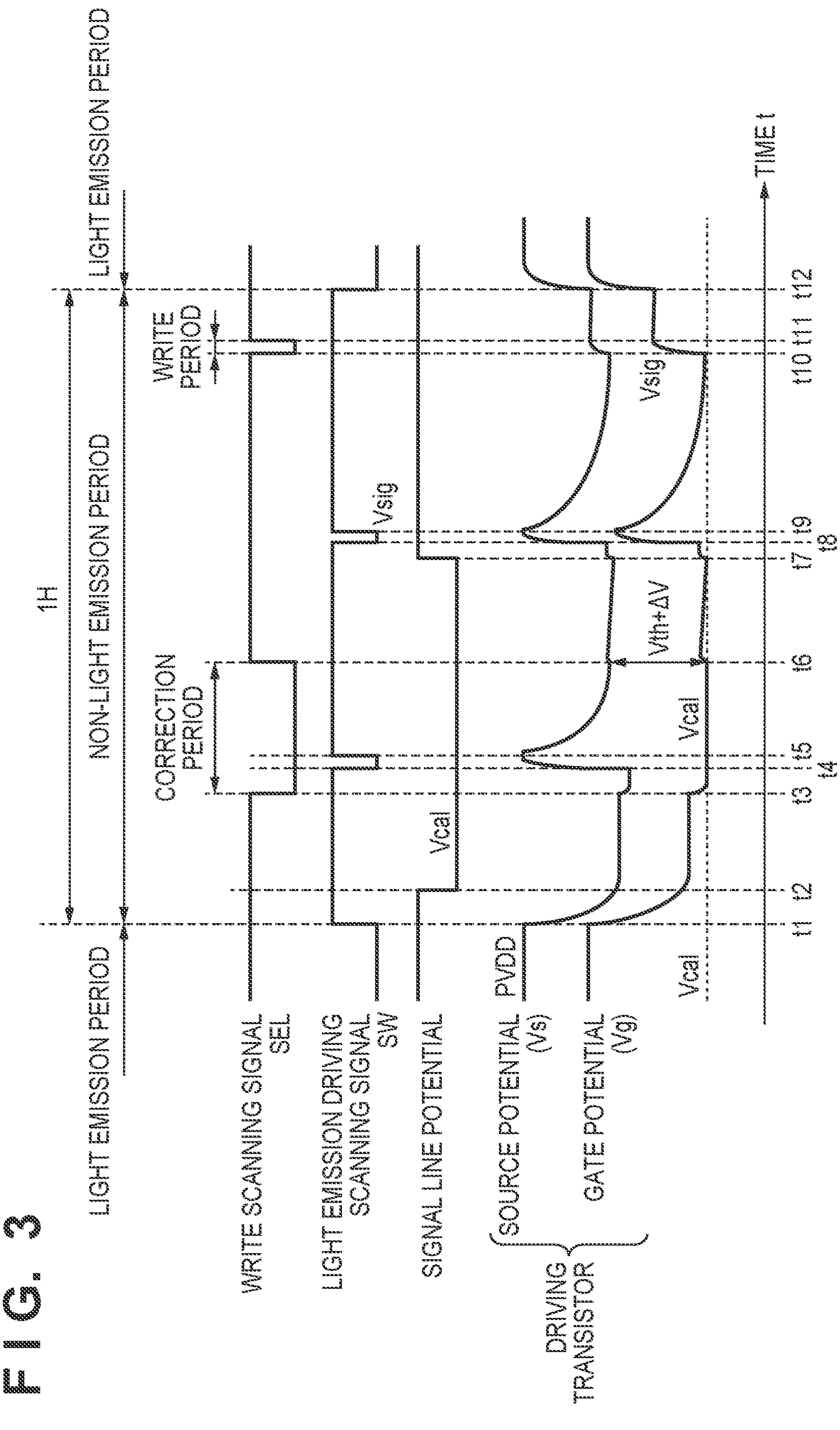
FIG. 3 is a timing chart showing an example of the operation of the light emitting device shown in FIG. 1.

Next, the circuit operation of the light emitting device 100 including the above-described pixel 101 will be described with reference to a timing chart shown in FIG. 3 and views showing the operations shown in FIGS. 4A to 4G. The timing chart of FIG. 3 shows changes in the write scanning signal SEL, the light emission driving scanning signal SW, the potential (to be sometimes referred to as a source potential Vs hereinafter) of the main terminal (source electrode) connected to the light emission control transistor 124 out of the two main terminals of the driving transistor 122, and the potential (to be sometimes referred to as a gate potential Vg hereinafter) of the control terminal (gate electrode). The views showing the operations of FIGS. 4A to 4G show the write transistor 123 and the light emission control transistor 124 using simple symbols as "switches" for the sake of simplicity.

In the timing chart of FIG. 3, a period until time t1 indicates the light emission period of the light emitting element 121 for a frame immediately before a frame of interest. During the light emission period for the preceding frame, the light emission driving scanning signal SW is in an active state (low-potential state), and thus the light emission control transistor 124 is in the conductive (ON) state. At this time, the write scanning signal SEL is in an inactive state (high-potential state), and the write transistor 123 is in a non-conductive (OFF) state.

Figure 4A:
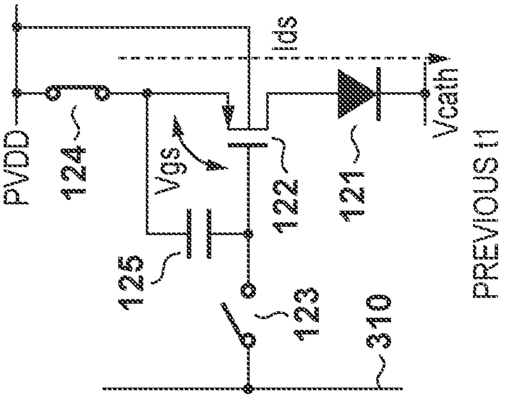
FIGS. 4A to 4G are views each for explaining the operation of the light emitting device at each timing in FIG. 3.

At this time, as shown in FIG. 4A, a driving current Ids corresponding to a gate-source voltage Vgs of the driving transistor 122 is supplied from the supply line 134, for supplying the potential PVDD, to the light emitting element 121 via the driving transistor 122. Thus, the light emitting element 121 emits light with luminance corresponding to the current value of the driving current Ids.

Figure 4B:
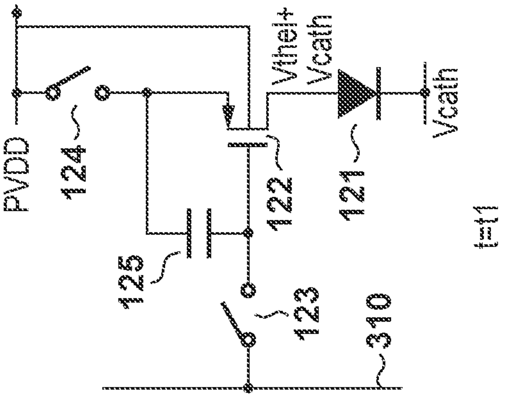

Then, at time t1, a new frame (frame of interest) for line sequential scanning starts. At time t1, the light emission driving scanning signal SW is set in an inactive state, and thus the light emission control transistor 124 is set in a non-conductive state, as shown in FIG. 4B. This stops supplying the current from the supply line 134, for supplying the potential PVDD, to the light emitting element 121 via the driving transistor 122. Thus, the light emitting element 121 emits no light and the non-light emission period for the frame of interest starts.

If no current is supplied to the light emitting element 121, the anode potential of the light emitting element 121 converges to a potential Vthel+Vcath which is the sum of a threshold voltage Vthel and a cathode potential Vcath of the light emitting element 121. At this time, the write transistor 123 and the light emission control transistor 124 are maintained in the non-conductive state. Here, the cathode potential Vcath of the light emitting element 121 can be equal to the potential PVSS of the supply line 135.

At time t2 after a predetermined time elapses since time t1, the signal output circuit 300 supplies the reference signal Vcal to the signal line 310. The potential of the reference signal Vcal is common to the pixels 101 arranged in the pixel array 110.

Then, the correction period starts from time t3. The correction period is a period from time t3 to time t6. The correction period is a period during which the reference signal Vcal is supplied to the signal line 310, the write transistor 123 is rendered conductive, and the reference signal Vcal is written in the control terminal of the driving transistor 122. The correction period includes a threshold correction preparation period from time t3 to time t5, and a threshold voltage correction period from time t5 to time t6.

Figure 4C:
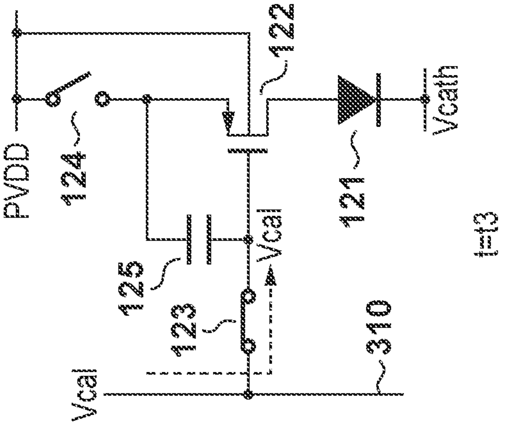

First, in the threshold correction preparation period starting from time t3, the write scanning signal SEL is set in an active state, and thus the write transistor 123 is set in the conductive state. At this time, as shown in FIG. 4C, the reference signal Vcal is supplied from the signal output circuit 300 to the signal line 310, and the reference signal Vcal is written in the control terminal of the driving transistor 122 via the write transistor 123.

Figure 4D:
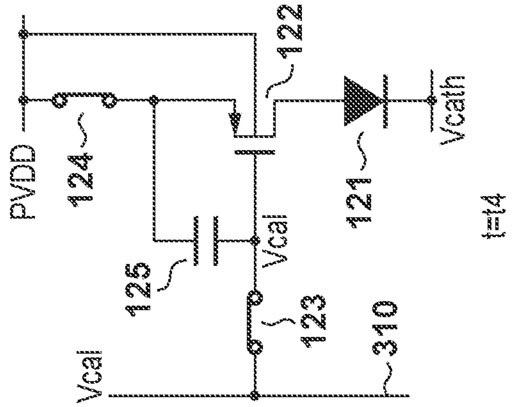

Then, at time t4 when the write transistor 123 is in the conductive state, the light emission driving scanning signal SW is set in the active state, and the light emission control transistor 124 is set in the conductive state, as shown in FIG. 4D. When the light emission control transistor 124 is rendered conductive, the source potential Vs of the driving transistor 122 becomes equal to the potential PVDD of the supply line 134. Here, in order to normally perform the correction operation in the threshold voltage correction period following the threshold correction preparation period, the potential of the reference signal Vcal may be set so as to make the gate-source voltage Vgs=|Vcal−PVDD| of the driving transistor 122 higher than a threshold voltage |Vth| of the driving transistor 122. That is, a relationship expressed by |Vcal−PVDD|>|Vth| may be satisfied. At time t4, since supply of a current from the supply line 134 of the potential PVDD to the driving transistor 122 is allowed, a current flows to the driving transistor 122 in accordance with the gate-source voltage Vgs of the driving transistor 122.

Figure 4E:
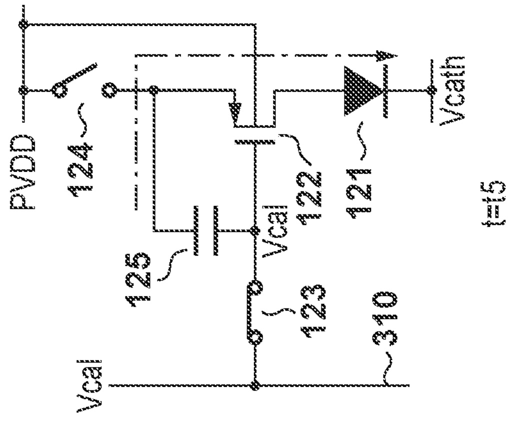

Then, at time t5, the light emission driving scanning signal SW transitions from the active state to the inactive state, and the light emission control transistor 124 is set in the non-conductive state. At this time, a current flows through a path of the capacitive element 125→the driving transistor 122→the light emitting element 121, as shown in FIG. 4E (an alternate long and short dashed line in FIG. 4E).

Thus, in the state in which the reference signal Vcal is input to the control terminal of the driving transistor 122, threshold voltage correction processing of changing the source potential Vs from the potential PVDD in a direction in which the gate-source voltage Vgs of the driving transistor 122 decreases is performed. The change in the source potential Vs of the driving transistor 122 is as shown in the timing chart of FIG. 3. As the threshold voltage correction processing progresses in the threshold voltage correction period from time t5, the source potential Vs of the driving transistor 122 lowers from the potential PVDD. This correction processing decreases the gate-source voltage Vgs of the driving transistor 122, and also changes the difference between the source potential Vs and the potential (to be sometime referred to as a back gate potential Vb hereinafter) of the back gate terminal of the driving transistor 122.

In general, the threshold voltage of the transistor changes depending on the difference between the back gate potential Vb and the source potential Vs. More specifically, in the case of the p-channel transistor, if the back gate potential Vb is lower than the source potential Vs, the threshold voltage is shifted to the negative side, and if the back gate potential Vb is higher than the source potential Vs, the threshold voltage is shifted to the positive side.

In the operation shown in FIG. 3, along with the operation of the threshold voltage correction processing, the source potential Vs decreases from the potential PVDD, and thus the difference PVVD−Vs between the back gate potential Vb and the source potential Vs increases with time. Therefore, along with a decrease in the source potential Vs, the threshold voltage of the driving transistor 122 is shifted more to the positive side. After a predetermined time elapses, the gate-source voltage Vgs of the driving transistor 122 converges to the threshold voltage |Vth+ΔV| considering the back gate potential Vb, and the value of the threshold voltage |Vth+ΔV| is held in the capacitive element 125. In this case, the potential Vth indicates the threshold voltage of the driving transistor 122 when the light emitting element 121 emits light, that is, when the source potential Vs and the back gate potential Vb are equal to the potential PVDD. The potential ΔV indicates the shift amount of the threshold voltage caused by the difference between the source potential Vs and the back gate potential Vb at the time of the operation of the threshold voltage correction processing during the correction period.

The threshold voltage correction processing ends at time t6 when the write scanning signal SEL transitions from the active state to the inactive state and the write transistor 123 is set in the non-conductive state. As has been described above, in the correction period, the light emission control transistor 124 is rendered conductive during the conductive state of the write transistor 123, and the correction processing of the threshold voltage of the driving transistor 122 is performed.

The period of the threshold voltage correction processing may be longer than a period during which the write transistor 123 and the light emission control transistor 124 are both in the ON state to make the gate-source voltage Vgs of the driving transistor 122 converge to the voltage |Vth+ΔV|, as described above. That is, in the correction period (from time t3 to time t6) during which the write transistor 123 is rendered conductive and the reference signal Vcal is written in the control terminal of the driving transistor 122, the length of the period (from time t5 to time t6) from when the light emission control transistor 124 changes from the conductive state to the non-conductive state until the correction period ends may be longer than the length of the period (from time t4 to time t5) during which the light emission control transistor 124 is rendered conductive.

As has been described above, since the correction period includes the period during which the current flows to the light emitting element 121, the light emitting element 121 emits light. However, the correction period (the threshold correction preparation period and the threshold voltage correction period) is very short with respect to the period of one frame, so major problems such as abnormal light emission do not occur.

Figure 5:
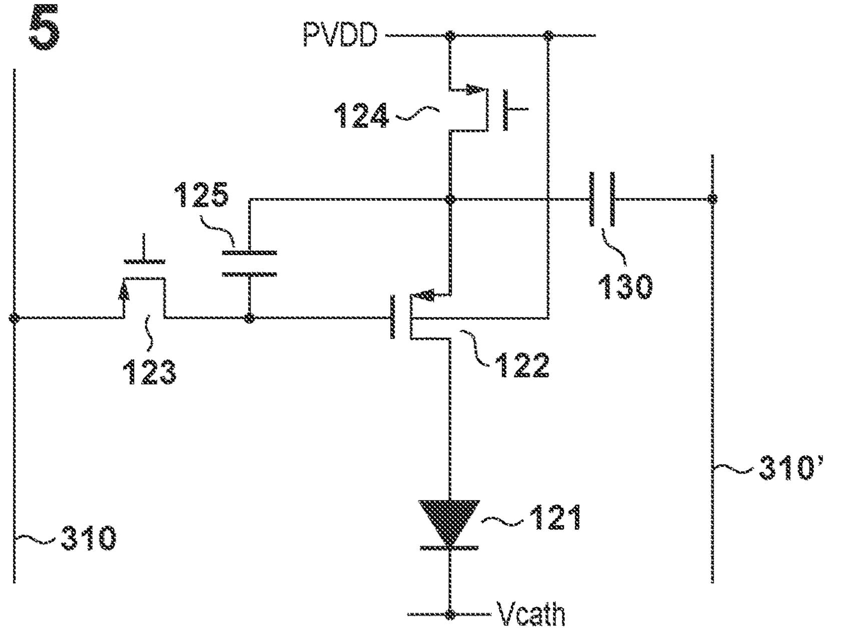
FIG. 5 is a view for explaining a parasitic capacitance between the pixel shown in FIG. 2 and a signal line arranged in an adjacent pixel.

At time t7 after a predetermined time elapses from time t6, the luminance signal Vsig corresponding to a video or the like to be displayed is supplied from the signal output circuit 300 to the pixel array 110. That is, the potential of the signal line 310 is switched from the potential of the reference signal Vcal to the potential of the luminance signal Vsig. At this time, as shown in FIG. 5, a parasitic capacitance 130 exists between a signal line 310' of the pixel 101 arranged adjacent to the pixel 101 of interest and the main terminal (source electrode) connected to the light emission control transistor 124 out of the two main terminals of the driving transistor 122 of the pixel 101 of interest. Accordingly, a change in potential of the signal line 310' of the adjacent pixel 101 is input to the source electrode of the driving transistor via the parasitic capacitance 130, and the source potential Vs changes. At this time, the capacitive element 125 is arranged between the gate and source of the driving transistor 122, and the write transistor 123 is set in the non-conductive state. Hence, even if the source potential of the driving transistor 122 changes, the gate-source voltage of the driving transistor 122 remains at |Vth+ΔV|. Therefore, due to the signal potential of the pixel 101 adjacent to the pixel 101 of interest, the potential of the control terminal of the driving transistor 122 changes in accordance with the change of the source potential Vs.

Thereafter, at time t8, the light emission driving scanning signal SW transitions from the inactive state to the active state, and thus the light emission control transistor 124 is set in the conductive state. At this time, the source potential Vs of the driving transistor 122 becomes equal to the potential PVDD, but the gate-source voltage Vgs of the driving transistor 122 remains at |Vth+ΔV| due to the capacitive element 125 connected between the gate and source of the driving transistor 122. However, since the source potential Vs of the driving transistor 122 becomes equal to the potential PVDD, the source potential Vs becomes equal to the back gate potential Vb. Hence, the threshold voltage of the driving transistor 122 becomes |Vth|, and a current flows from the supply line 134 of the potential PVDD to the driving transistor 122.

Figure 4F:
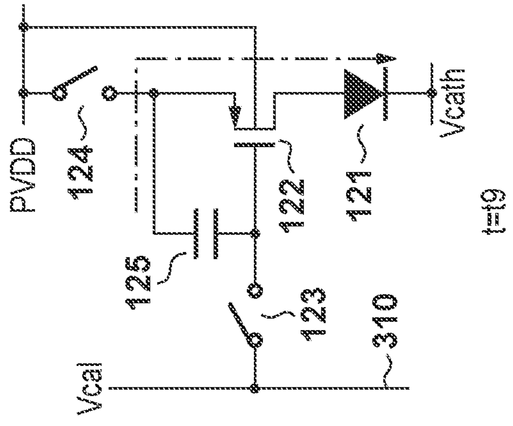

Then, at time t9, the light emission driving scanning signal SW transitions from the active state to the inactive state again, and thus the light emission control transistor 124 is set in the non-conductive state. At this time, a current flows through a path of the capacitive element 125→the driving transistor 122→the light emitting element 121, as shown in FIG. 4F (an alternate long and short dashed line in FIG. 4F). The gate-source voltage Vgs of the driving transistor 122 remains at |Vth+ΔV| held in the capacitive element 125 as described above. Therefore, when a current flows as shown in FIG. 4F, the source potential Vs decreases to the source potential which allows the threshold voltage of the driving transistor 122 to implement |Vth+ΔV|. After a predetermined time elapses, the potential of the control terminal of the driving transistor 122 becomes equal to the potential at the end (time t6) of the operation in the threshold voltage correction period.

Thereafter, after the correction period (time t3 to time t6), the luminance signal Vsig is supplied to the signal line 310, the write transistor 123 is rendered conductive, and the write period (time t10 to time t11) starts, during which the luminance signal Vsig is written in the control terminal of the driving transistor 122. During the write period for the luminance signal Vsig starting from time t10, the write transistor 123 is set in the conductive state, and the potential of the luminance signal Vsig supplied to the signal line 310 is input to the control terminal of the driving transistor 122. With this operation, with respect to the voltage held in the capacitive element 125, a value decided by the difference (Vsig−Vcal) between the luminance signal Vsig and the reference potential, a capacitance value $C_1$ of the capacitive element 125, and a capacitance value $C_{pALL}$ which is the sum of the parasitic capacitance 130 on the source electrode of the driving transistor 122 and the like as expressed by equation (1) is added to the gate-source voltage Vgs of the driving transistor 122.

$$Vgs\text{ change amount} \approx \{C_{pALL}/(C_1+C_{pALL})\}\times(\text{Vsig}-\text{Vcal}) \quad (1)$$

Figure 4G:
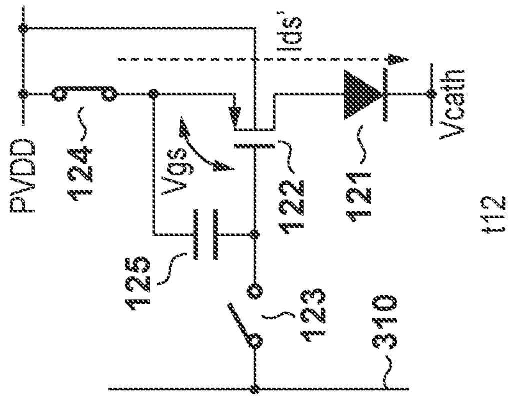

Then, at time t11, the write transistor 123 is set in the non-conductive state, and writing of the luminance signal Vsig ends. At time t12 after a predetermined time elapses after the end of the write period, the light emission driving scanning signal SW transitions from the inactive state to the active state, the light emission control transistor 124 changes from the non-conductive state to the conductive state, and supply of a current from the supply line 134 to the driving transistor 122 is allowed. At this time, as shown in FIG. 4G, a current Ids' corresponding to the gate-source voltage Vgs of the driving transistor 122 is supplied to the light emitting element 121. With this, the light emission period for the frame of interest starts, during which the light emitting element 121 performs light emission corresponding to the potential of the luminance signal Vsig.

As has been described above, in this embodiment, after the end of the correction period (time t3 to time t6) and before the start of the write period (time t10 to time t11), the light emission control transistor 124 is rendered conductive in a period from time t8 to time t9. With this, in the period from the end of the correction period to the start of the write period, the influence of a change in potential input from the signal line 310' corresponding to the pixel 101 adjacent to the pixel 101 of interest to the source electrode of the driving transistor 122 can be reduced. Accordingly, a change in potential of the control terminal of the driving transistor 122 caused by a change in the source potential Vs of the driving transistor 122 can be reduced. In this manner, the potential of the control terminal of the driving transistor 122 before the write period is less influenced by the change in potential of the signal line 310' of another pixel 101 adjacent to the pixel 101, so poor image quality such as unevenness, streaks, and roughness is less likely to occur. As a result, deterioration in image quality in the light emitting device 100 can be suppressed.

It has been described above that, supply of the luminance signal Vsig to the signal line 310 is started at the time (time t7) before the light emission control transistor 124 is rendered conductive (time t8) after the end (time t6) of the correction period and before the start (time t10) of the write period. However, the present invention is not limited to this. Supply of the luminance signal Vsig to the signal line 310 may be started after the light emission control transistor 124 changes from the conductive state to the non-conductive state after the end (time t6) of the correction period and before the start (time t10) of the write period. That is, the potential supplied to the signal line may be switched from the potential of the reference signal Vcal to the potential of the luminance signal Vsig not at time t7 but in the period from time t9 to time t10. The potential of the signal line 310 is only required to be switched from the potential of the reference signal Vcal to the potential of the luminance signal Vsig during a state in which the source potential Vs of the driving transistor 122 is higher than the source potential Vs at the end (time t6) of the correction period. In this case, when the change in potential of the signal line 310' is input to the source electrode of the driving transistor 122, the source potential Vs of the driving transistor 122 is higher than the source potential Vs at the end of the correction period, so that the threshold voltage of the driving transistor 122 is lower than |Vth+ΔV|. Therefore, a current flows via the driving transistor 122, and the source potential Vs decreases to the source potential which allows the threshold voltage of the driving transistor 122 to implement | Vth+ΔV|. As a result, after a predetermined time elapses, the potential of the control terminal of the driving transistor 122 becomes equal to the potential at the end of the correction period.

Figure 6:
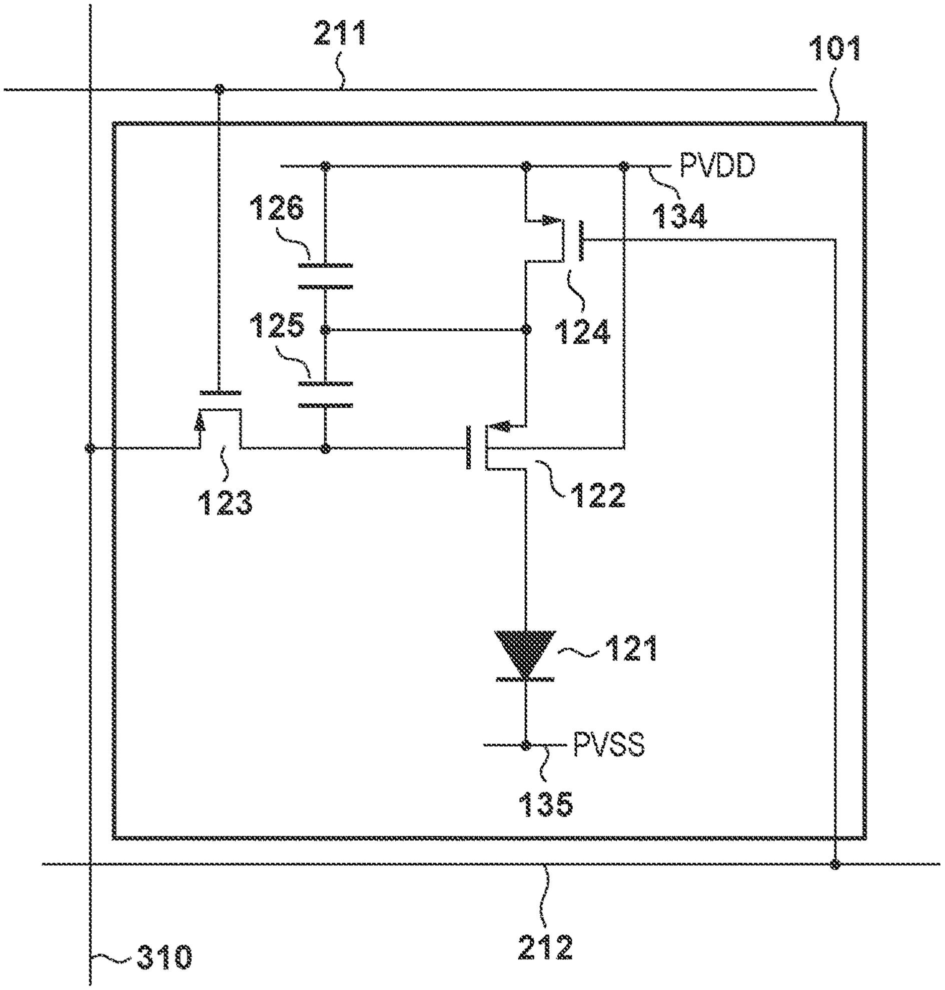
FIG. 6 is a view showing a modification of the pixel shown in FIG. 2.

In this embodiment, in the circuit arrangement of the pixel 101, as shown in FIG. 6, an additional capacitive element 126 (capacitance value $C_2$) may be arranged between the capacitive element 125 and the supply line 134. It can be said that the capacitive element 126 is connected between the supply line 134 and the main terminal not connected to the light emitting element 121 out of the two main terminals of the driving transistor 122. In this case, the change amount of the gate-source voltage Vgs of the driving transistor 122 at time t10 is expressed as:

$$Vgs\ \text{change amount} \approx \{(C_2+C_{pALL})/(C_1+C_2+C_{pALL})\}\times(\text{Vsig}-\text{Vcal}) \quad (2)$$

The change amount of the gate-source voltage Vgs of the driving transistor 122 can be increased as compared to the change amount expressed by equation (1) even with the same change amount of the potential of the signal line 310. Hence, as compared to the arrangement of the pixel 101 shown in FIG. 2, the arrangement of the pixel 101 shown in FIG. 6 can decrease the amplitude of the potential corresponding to the luminance value of the luminance signal Vsig supplied to the signal line 310. That is, when the amplitude of the potential supplied to the signal line 310 decreases, the power for driving the signal line 310 can be suppressed, and the low power consumption of the light emitting device 100 can be implemented.

Figure 7:
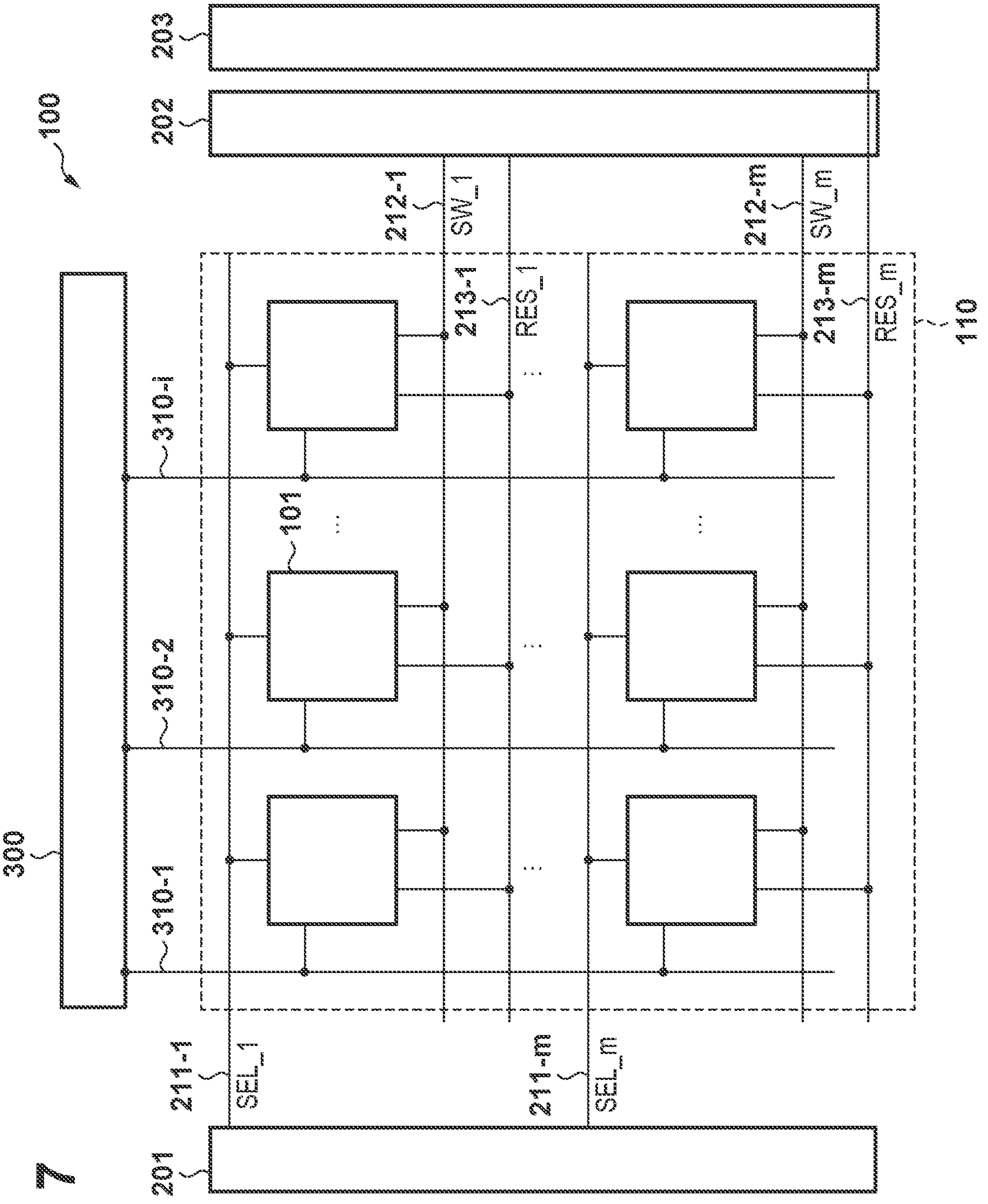
FIG. 7 is a view showing a modification of the light emitting device shown in FIG. 1.
Figure 8:
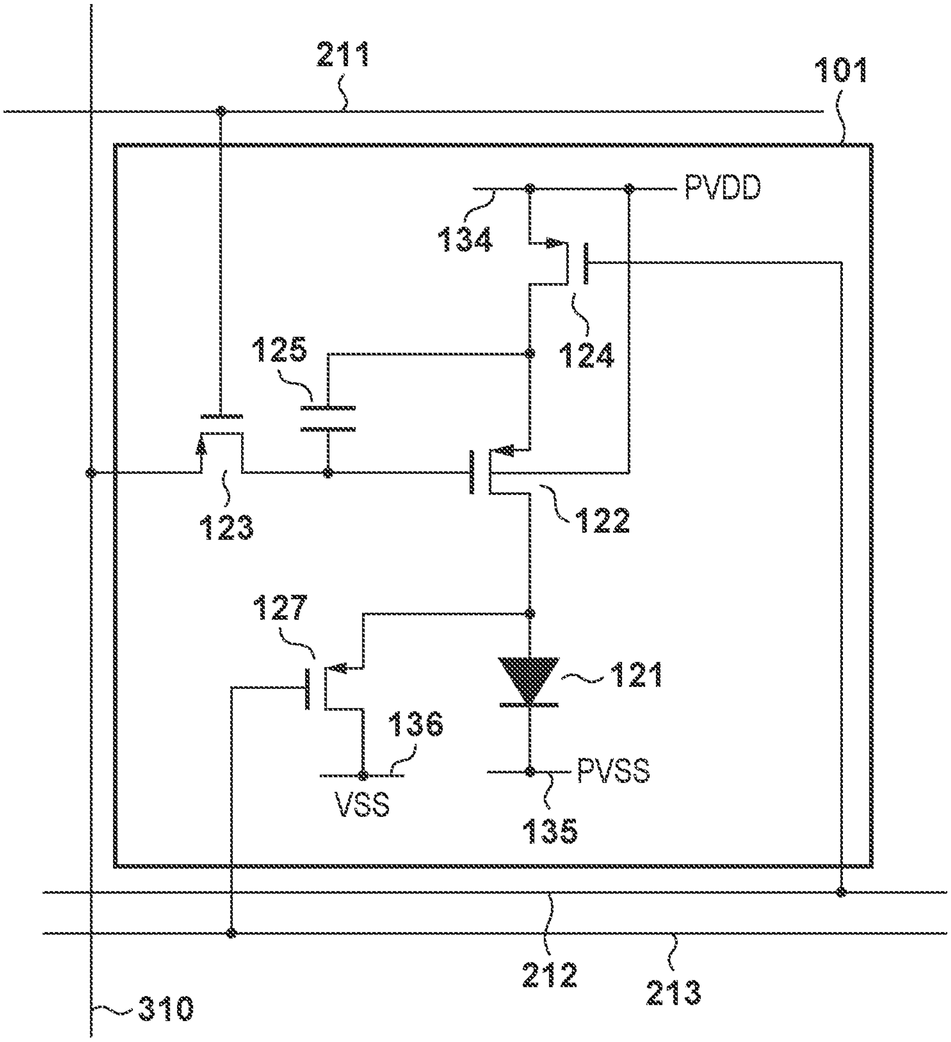
FIG. 8 is a view showing an example of the arrangement of a pixel of the light emitting device shown in FIG. 7.

Next, a modification of the light emitting device 100 shown in FIG. 1 will be described with reference to FIG. 7. FIG. 7 is a schematic view showing an example of the arrangement of the light emitting device 100 according to this embodiment. FIG. 8 is a circuit diagram showing an example of the arrangement of the pixel 101 used for the light emitting device 100 shown in FIG. 7. As compared to the light emitting device 100 shown in FIG. 1, an initialization scanning circuit 203 is further arranged in the light emitting device 100 shown in FIG. 7. In addition, as compared to the pixel 101 shown in FIG. 2, a reset transistor 127 is added to the pixel 101 shown in FIG. 8. The remaining arrangement of the light emitting device 100 shown in FIG. 7 and the pixel 101 shown in FIG. 8 may be similar to the respective arrangements described above. The arrangement different from the above-described arrangement will be mainly described, and a description of the arrangement which may be similar to the above-described arrangement will be omitted as appropriate.

In the arrangement shown in FIG. 7, with respect to the pixel 101 arranged in m rows×i columns, scanning lines 213-1 to **213-*m* are arranged for each pixel row in the row direction. Each of the scanning lines 213-1 to 213-*m* is connected to an output terminal of the initialization scanning circuit 203 in a corresponding row. The initialization scanning circuit 203 may be formed by a shift register that sequentially shifts (transfers) a start pulse in synchronization with a clock pulse supplied from a control circuit (not shown) that controls the light emitting device 100. The initialization scanning circuit 203 supplies initialization scanning signals RES (RES_1 to RES_m) for resetting the light emitting elements 121 of the pixels 101 to the scanning lines 213 (213-1 to 213-*m*) in synchronization with line sequential scanning by the write scanning circuit 201**.

In correspondence with the initialization scanning circuit 203, as shown in FIG. 8, the pixel 101 includes the reset transistor 127 that resets, to a potential VSS, the terminal (anode electrode) connected to the driving transistor 122 out of the two terminals of the light emitting element 121 arranged in the pixel 101. The control terminal (gate electrode) of the reset transistor 127 is connected to the scanning line 213. One main terminal of two main terminals of the reset transistor 127 is connected to the anode electrode of the light emitting element 121, and the other main terminal is connected to a supply line 136 which supplies the negative potential VSS.

In the arrangement shown in FIG. 8, with respect to the driving transistor 122 using a p-channel transistor, a p-channel transistor is also used as the reset transistor 127. However, the present invention is not limited to this, and an n-channel transistor may be used for the reset transistor 127.

Here, the threshold voltage of the light emitting element 121 is denoted by Vthel, and the potential (cathode potential) of the terminal (cathode electrode) not connected the driving transistor 122 out of the two terminals of the light emitting element 121 is denoted by Vcath. The cathode potential Vcath of the light emitting element 121 can be equal to the potential VSS of the supply line 135 as described above. In this case, the potential VSS can be set so as to satisfy a condition expressed by VSS<Vthel+Vcath. With this, it is possible to set the potential of the anode electrode of the light emitting element 121 to a potential which does not allow the light emitting element 121 to emit light when the reset transistor 127 is set in a conductive (ON) state. Here, it is assumed that the potential VSS is different from the cathode potential Vcath of the light emitting element 121, but they may be the same. For example, the main terminal not connected to the light emitting element 121 out of the two main terminals of the reset transistor 127 may be connected to the supply line 135. If the reset transistor 127 is connected to the supply line 135, it is unnecessary to provide, for each pixel 101, supply lines for supplying a plurality of kinds of negative potentials, so that the number of wiring patterns can be reduced.

Figure 9:
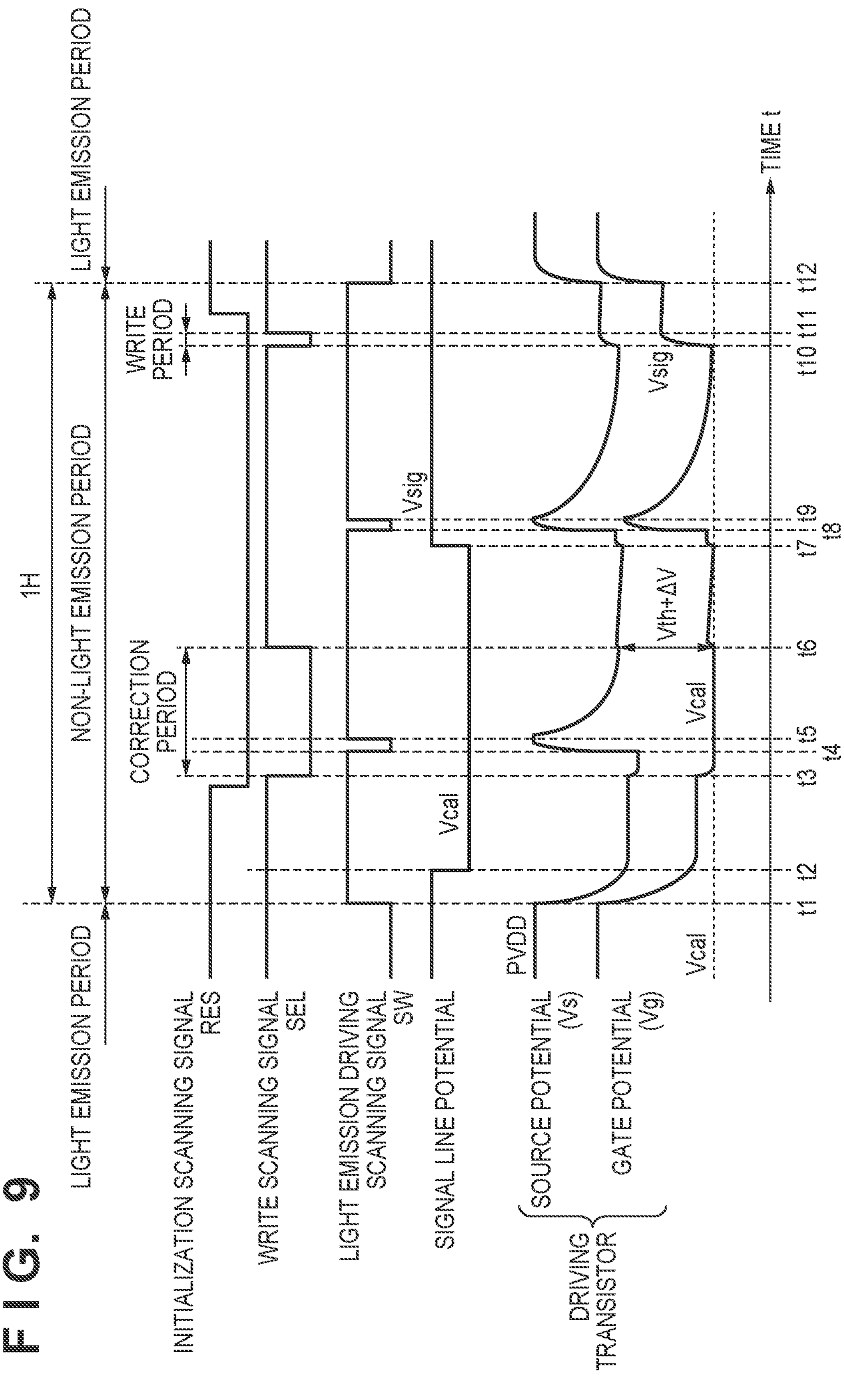
FIG. 9 is a timing chart showing an example of the operation of the light emitting device shown in FIG. 7.

An example of driving timings of the light emitting device 100 shown in FIG. 7 and the pixel 101 shown in FIG. 8 is shown in FIG. 9. As shown in FIG. 9, the reset transistor 127 is in a conductive state in a period from the correction period to the write period. More specifically, the reset transistor 127 connected to the anode electrode of the light emitting element 121 is set in the conductive state before the correction period during which the reference signal Vcal is written in the control terminal of the driving transistor 122, and thus the negative potential VSS is written in the anode electrode of the light emitting element 121. With this operation, the anode potential of the light emitting element 121 is set to VSS during the correction period, so no current flows to the light emitting element 121 during the correction period. That is, by arranging the resent transistor 127, a phenomenon such as so-called fading of a black color does not occur in black display. As a result, satisfactory contrast can be obtained in the light emitting device 100.

Also in the pixel 101 shown in FIG. 8, the capacitive element 126 may be arranged as shown in FIG. 6. With this arrangement, as has been described above, the change amount of the gate-source voltage Vgs of the driving transistor 122 at time t10 becomes the change amount expressed by equation (2), so that the low power consumption of the light emitting device 100 can be implemented as described above.

Figure 10:
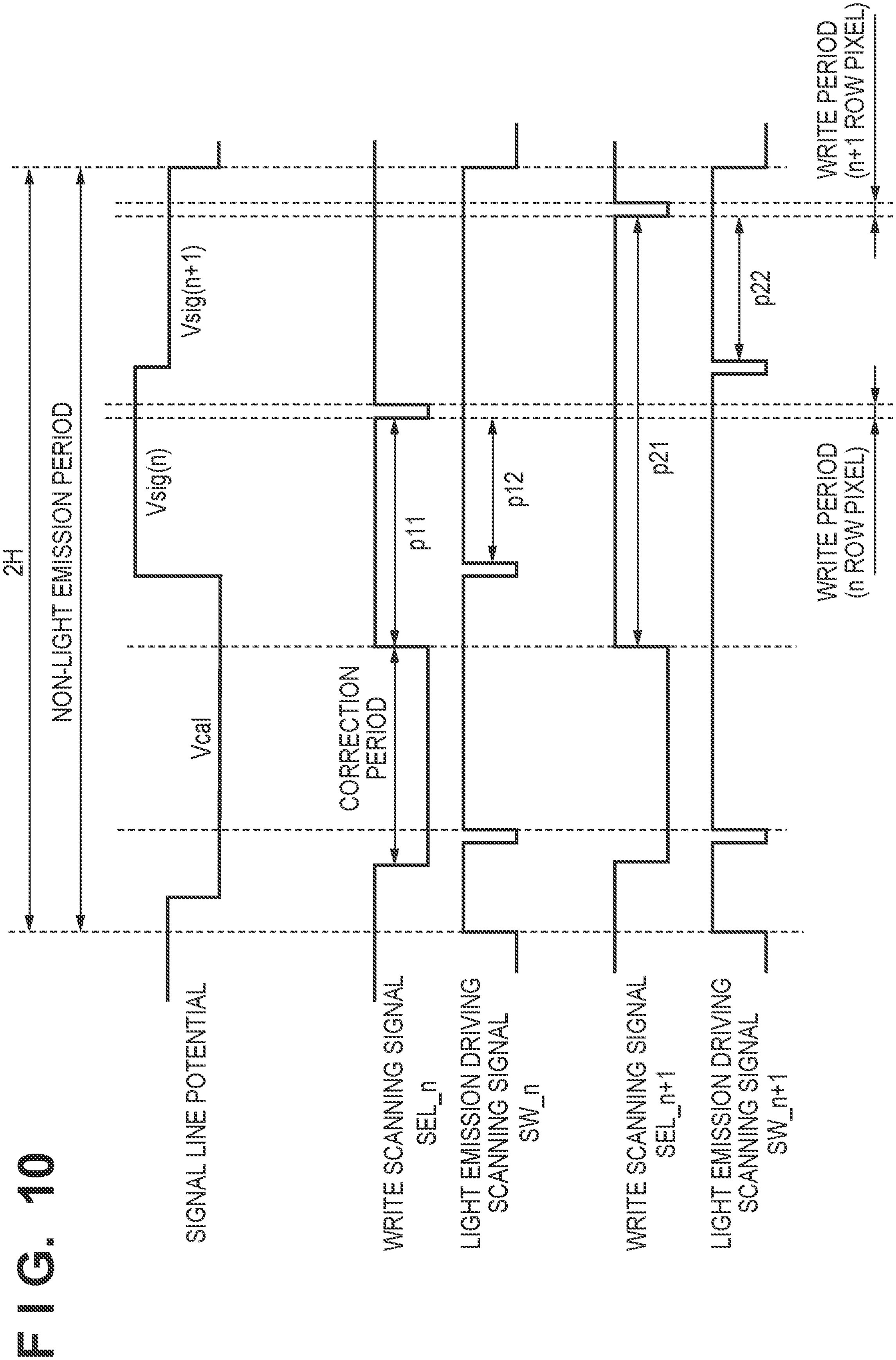
FIG. 10 is a timing chart showing an example of the operation of the light emitting device shown in FIG. 1.

FIG. 10 is a timing chart showing an example of the circuit operation of the light emitting device 100 different from the above. The arrangement of the light emitting device 100 may be similar to the arrangement shown in FIG. 1, and the arrangement of the pixel 101 may be similar to the arrangement shown in FIG. 2. Hence, the operation different from that described above will be mainly described here, and a description of the operation and arrangement that may be similar to those described above will be omitted as appropriate.

As has been described above, in the pixel array 110, the plurality of pixels 101 are arranged so as to form the plurality of rows. In the circuit operation shown in FIG. 10, the operation in the correction period described above is executed at the same timing in the pixels 101 arranged in at least two rows of the plurality of rows arranged in the pixel array 110. On the other hand, as shown in FIG. 10, after the end of the correction period, in the pixels 101 arranged in at least two rows where the operation in the correction period is executed at the same time, the timing of rendering the light emission control transistor 124 conductive before the start of the write period is different between the pixels 101.

Here, as shown in the timing chart of FIG. 10, assume that the pixels 101 where the operation in the correction period is executed at the same timing are the pixel 101 arranged in the nth row and the pixel 101 arranged in the (n+1)th row. In the timing chart shown in FIG. 10, the pixels 101 arranged in two rows are simultaneously corrected, but the pixels 101 arranged in three or more rows may be simultaneously corrected. If the operation in the correction period is executed at the same timing in the pixels, as shown in FIG. 10, the write transistor 123 in each pixel is rendered conductive in accordance with the write scanning signal SEL while the reference signal Vcal is supplied to the signal line 310, and the light emission control transistor 124 in each pixel is rendered conductive in accordance with the light emission driving scanning signal SW at the same timing while the write transistor 123 is rendered conductive.

As shown in FIG. 10, during one non-light emission period, the potential of the signal line 310 changes to the potential of the reference signal Vcal, to the potential of the luminance signal Vsig(n) in the nth row, and then to the potential of the luminance signal Vsig(n+1) in the (n+1)th row. On the other hand, in the driving shown in FIG. 3, in order to supply the luminance signal Vsig to each of the two rows, it is required to change the potential of the signal line 310 to the potential of the reference signal Vcal→the potential of the luminance signal Vsig(n) in the nth row→the potential of the reference signal Vcal→the potential of the luminance signal Vsig(n+1) in the (n+1)th row. Therefore, in the driving shown in FIG. 10, the change in potential supplied to the signal line 310 can be reduced, and the mount (number of times) of charge/discharge of the signal line 310 can be suppressed. As a result, the driving speed of the light emitting device 100 can be increased, and the power consumption of the driving power thereof can be reduced.

Next, the timing of rendering the light emission control transistor 124 conductive, after the end of the correction period and before the start of the write period, in each of the pixels 101 arranged in two rows where the operation in the correction period is executed at the same timing will be described. In the operation shown in FIG. 10, the time difference (p22−p12) between (1) a time p12 from the timing when the light emission control transistor 124 is rendered conductive in the pixel 101 arranged in the nth row after the end of the correction period to the start of the write period in the pixel 101 arranged in the nth row and (2) a time p22 from the timing when the light emission control transistor 124 is rendered conductive in the pixel 101 arranged in the (n+1) th row after the end of the correction period to the start of the write period in the pixel 101 arranged in the (n+1) th row is shorter than the time difference (p21−p11) between (1) a time p11 from the end of the correction period to the start of the write period in the pixel 101 arranged in the nth row and (2) a time p21 from the end of the correction period to the start of the write period in the pixel 101 arranged in the (n+1) th row.

In the period from the end of the correction period to the start of the write period during which the luminance signal Vsig is input to the control terminal of the driving transistor 122, a small current can flow to the driving transistor 122. Therefore, the source potential Vs of the driving transistor 122 can decrease with time, and the potential of the control terminal of the driving transistor 122 via the capacitive element 125 also decreases. In the operation shown in FIG. 10, the time from the end of the correction period to the start of the write period changes for each row. Accordingly, if the light emission control transistor 124 is not rendered conductive between the correction period and the write period, the potential of the control terminal of the driving transistor 122 decreases more in the (n+1)th row than in the nth row. That is, the potential of the control terminal of the driving transistor 122 before the luminance signal Vsig is written changes. As a result, a difference in light emission luminance is generated between the nth row and the (n+1)th row, and periodic streaks may be generated in a video (image) displayed on the light emitting device 100.

On the other hand, as shown in FIG. 10, the light emission control transistor 124 is rendered conductive after the correction period. With this, the difference, between the rows, in time from the timing when the light emission control transistor 124 returns to the non-conductive state to the start of the write period becomes smaller than the difference, between the rows, in time from the end of the correction period to the start of the write period. Thus, the influence of a small leak current for each row with respect to the source potential Vs of the driving transistor 122 can be reduced. For example, the time p12 from the timing when the light emission control transistor 124 is rendered conductive in the pixel 101 arranged in the nth row after the end of the correction period to the start of the write period in the pixel 101 arranged in the nth row may be equal to the time p22 from the timing when the light emission control transistor 124 is rendered conductive in the pixel 101 arranged in the (n+1)th row after the end of the correction period to the start of the write period in the pixel 101 arranged in the (n+1)th row.

As shown in FIG. 10, in the pixel 101 arranged in the (n+1)th row, after the end of the correction period, the light emission control transistor 124 may be rendered conductive after the end of the write period in the pixel 101 arranged in the nth row and before the start of the write period in the pixel 101 arranged in the (n+1)th row. Alternatively, for example, in the pixel 101 arranged in the (n+1)th row, the timing of rendering the light emission control transistor 124 conductive after the end of the correction period and before the start of the write period may be before the write period of the pixel 101 arranged in the nth row. The light emission control transistor 124 may be rendered conductive between the correction period and the write period such that the relationship expressed by (p21−p11)>(p22−p12) is satisfied as described above.

Figure 11A:
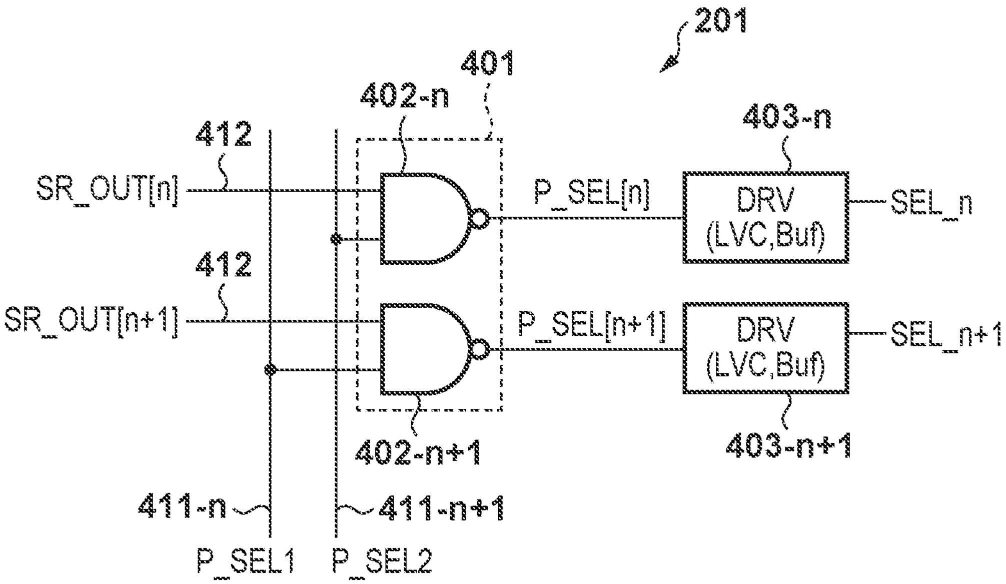
FIG. 11A is a view showing an example of the arrangement of a scanning circuit of the light emitting device shown in FIG. 1.

FIG. 11A shows an example of the arrangement, of the write scanning circuit 201 that controls conduction of the write transistor 123, for driving the pixel 101 arranged in the nth row and the pixel 101 arranged in the (n+1)th row in this embodiment. As shown in FIG. 11A, the write scanning circuit 201 includes a logic circuit unit 401. The logic circuit unit 401 is formed by including, for example, a NAND circuit. More specifically, the logic circuit unit 401 includes a circuit 402-*n* for supplying a signal instructing conduction of the write transistor 123 of the pixel 101 arranged in the nth row, and a circuit 402-*n*+1 for supplying a signal instructing conduction of the write transistor 123 of the pixel 101 arranged in the (n+1)th row. Further, the write scanning circuit 201 is connected to a plurality of control lines 411 and a control line 412 to which signals for controlling the write transistors 123 are supplied. For example, a signal P_SEL is input to the control line 411 from a control circuit (not shown) that controls the light emitting device 100. In addition, for example, a signal SR_OUT is supplied to the control line 412 from a shift register arranged in a control circuit (not shown) that controls the light emitting device 100, or the like. In the arrangement shown in FIG. 11A, out of the plurality of control lines 411, the control lines 411-*n* and 411-*n*+1 different from each other are connected to the circuit 402-*n* and the circuit 402-*n*+1, respectively. The control line 412 is connected to both the circuit 402-*n* and the circuit 402-*n*+1, and supplies the common signal SR_OUT to the circuit 402-*n* and the circuit 402-*n*+1

Figure 11B:
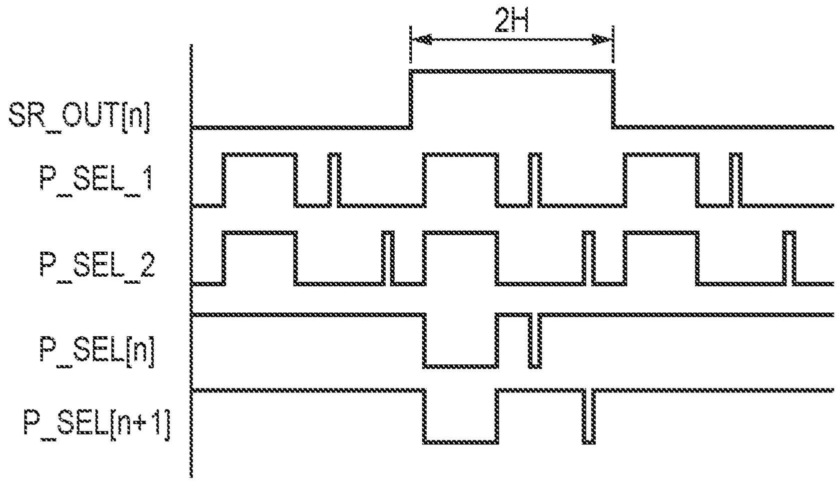
FIG. 11B is a view showing an example of input/output pulses of the scanning circuit of the light emitting device shown in FIG. 1.

FIG. 11B shows the signals SR_OUT[n], P_SEL1, and P_SEL2 input to the logic circuit unit 401 of the write scanning circuit 201, and the signals P_SEL[n] and P_SEL [n+1] output from the logic circuit unit 401. In this embodiment, the length of the period during which the signal SR_OUT[n] input to the logic circuit unit 401 is set in an active state corresponds to the horizontal periods (non-light emission periods) of the rows where the operation in the correction period is executed at the same timing in the pixel array 110. In the operation shown in FIG. 11B, as in the example shown in FIG. 10, the operation in the correction period is executed at the same timing in the pixels 101 arranged in two rows in the pixel array 110 where the pixels 101 are arranged so as to form the plurality of rows. Therefore, the length of the period during which the signal SR_OUT[n] is in the active state corresponds to 2H.

Each of the signals P_SEL1 and P_SEL2 supplied to the control lines 411-*n* and 411-*n*+1, respectively, is formed by a pulse for writing the reference signal Vcal to the pixel 101 (the control terminal of the driving transistor 122) in the correction period, and a pulse for writing the luminance signal Vsig to the pixel 101 (the control terminal of the driving transistor 122) in the write period. The cycle of each of the signal P_SEL1 and the signal P_SEL2 corresponds to the length of the horizontal periods (non-light emission periods) of the rows where the operation in the correction period is executed at the same timing. Accordingly, in this embodiment, the cycle of each of the signal P_SEL1 and the signal P_SEL2 corresponds to 2H. As shown in FIG. 11B, the signal P_SEL1 input to the pixel 101 arranged in the nth row and the signal P_SEL2 input to the pixel 101 arranged in the (n+1)th row are different in the phase of the pulse for writing the luminance signal Vsig. The signals P_SEL[n] and P_SEL[n+1] output from the logic circuit unit 401 are input to, for example, driver circuits 403 (403-*n* and 403-*n*+1) arranged in the write scanning circuit 201, each of which includes a level shifter, a buffer, and the like. The driver circuits 403 supply the above-described write scanning signals SEL_n and SEL_n+1 corresponding to the input signals P_SEL[n] and P_SEL[n+1] to the pixels 101 arranged in the corresponding rows of the pixel array 110 via the signal lines 310.

Figure 12:
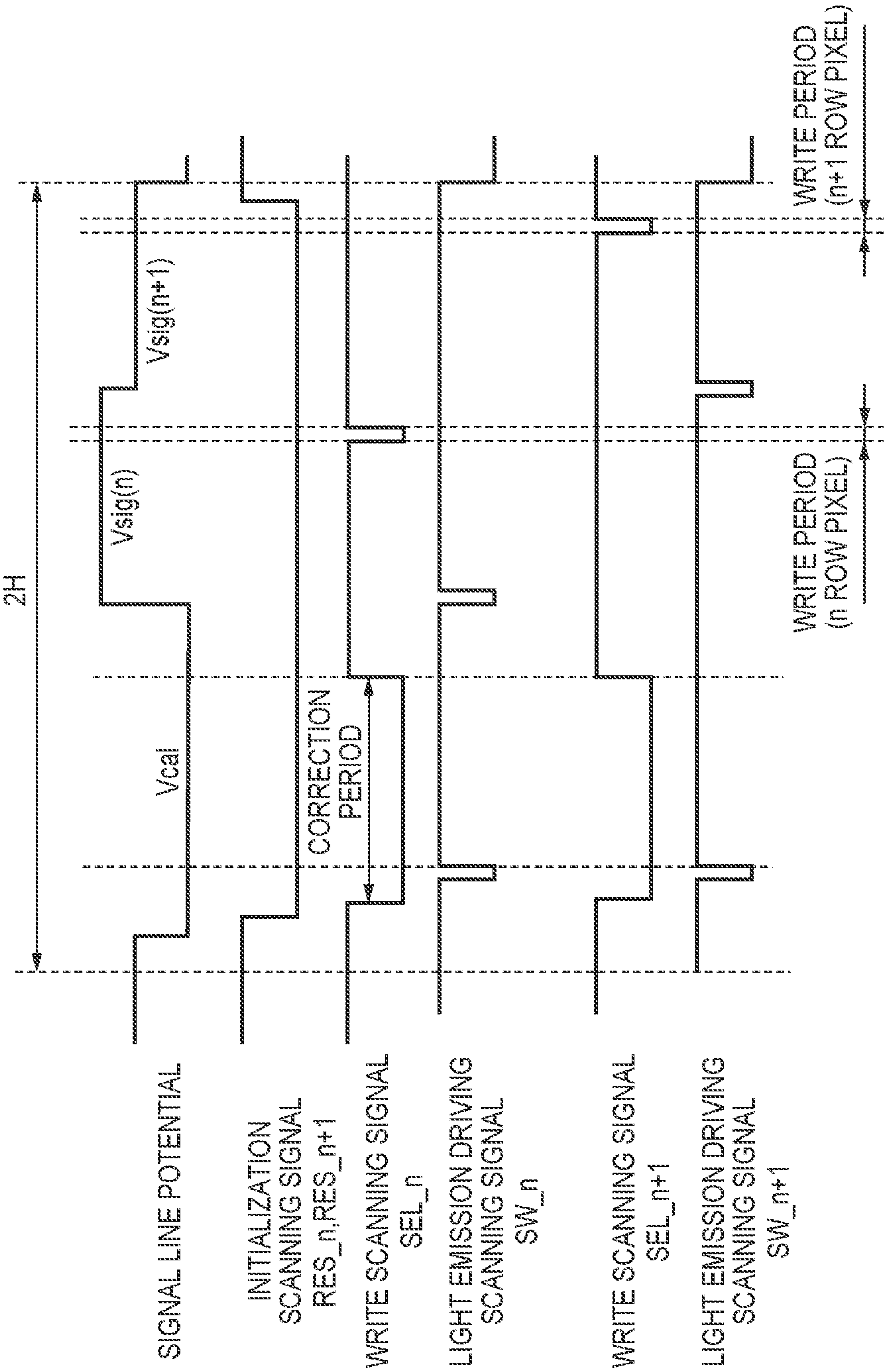
FIG. 12 is a timing chart showing an example of the operation of the light emitting device shown in FIG. 1.

Also in this embodiment, as shown in FIG. 6, the additional capacitive element 126 may be arranged between the capacitive element 125 and the supply line 134. Further, as shown in FIGS. 7 and 8, the reset transistor 127 that resets, to the potential VSS, the terminal (anode electrode) connected to the driving transistor 122 out of the two terminals of the light emitting element 121 may be included. In this case, as shown in FIG. 12, the timing of the initialization scanning signal RES for rendering the reset transistor 127 conductive may be common to multiple rows (two rows of the nth row and the (n+1)th row in FIG. 12) where the operation in the correction period is executed at the same timing. The above-described effect of the additional capacitive element 126 and the above-described effect of the reset transistor 127 can be respectively obtained. A combination of the additional capacitive element 126 and the reset transistor 127 may be used.

Figure 13:
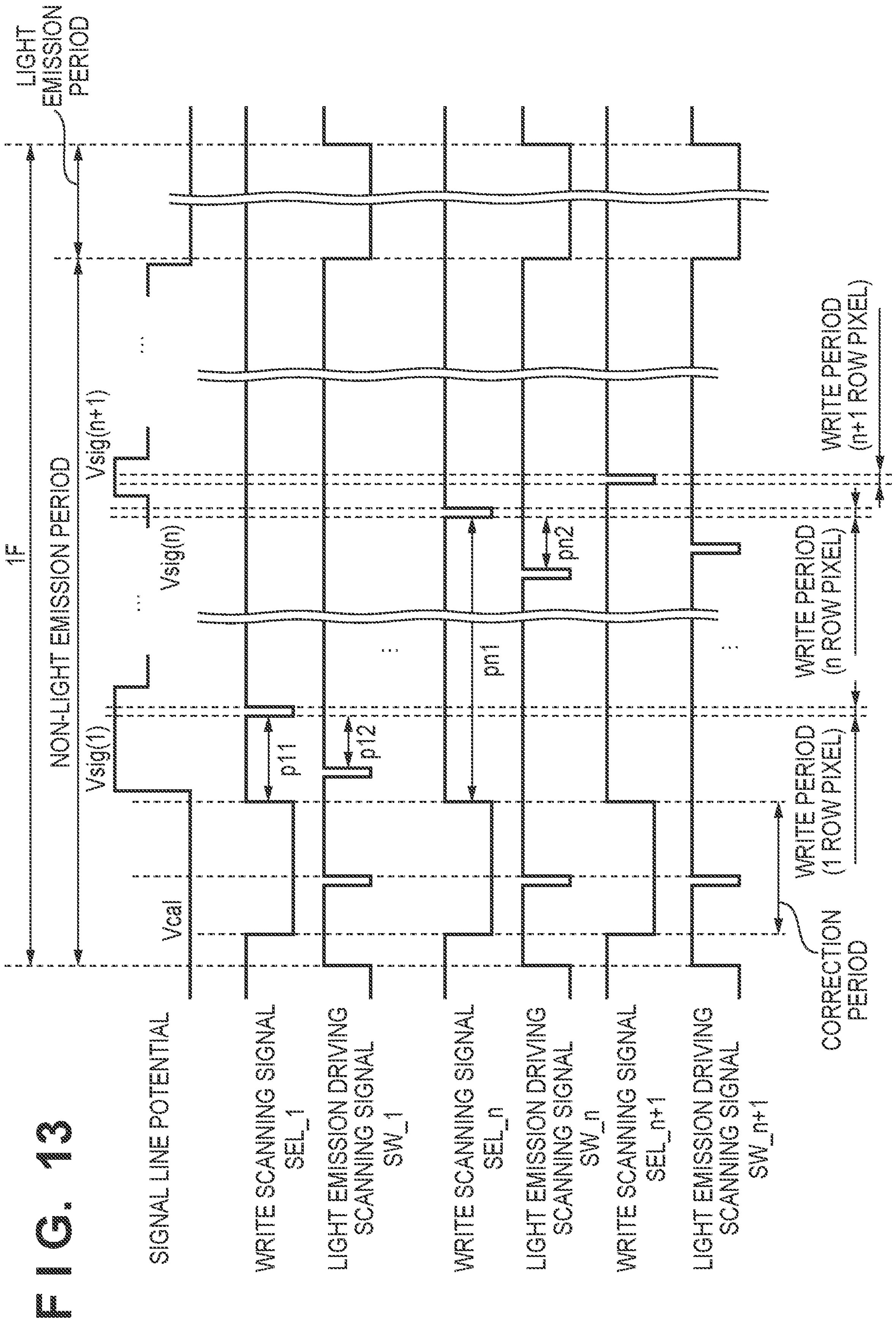
FIG. 13 is a timing chart showing an example of the operation of the light emitting device shown in FIG. 1.

FIG. 13 is a timing chart showing an example in which the circuit operation of the light emitting device 100 is different from the above. The arrangement of the light emitting device 100 may be similar to the arrangement shown in FIG. 1, and the arrangement of the pixel 101 may be similar to the arrangement shown in FIG. 2. Hence, the operation different from the above-described operation will be mainly described here, and a description of the operation and arrangement that may be similar to those described above will be omitted as appropriate.

As has been described above, in the pixel array 110, the plurality of pixels 101 are arranged so as to form the plurality of rows. In the circuit operation shown in FIG. 10, it has been described that the operation in the correction period described above is executed at the same timing in the pixels 101 arranged in at least two rows of the plurality of rows arranged in the pixel array 110. On the other hand, in the circuit operation shown in FIG. 13, the operation in the correction period described above is executed at the same timing in all rows (the first row to the mth row) of the plurality of rows arranged in the pixel array 110. After the end of the correction period, the light emission control transistor 124 is rendered conductive before the write period for each row. Further, after the write periods end in all rows, the light emission control transistors 124 are simultaneously rendered conductive in all rows, and thus transition from the non-light emission period to the light emission period is performed. The circuit operation shown in FIG. 13 is driving also called surface sequential driving or Global driving. Here, in the circuit operations shown in FIGS. 3 and 9, transition from the non-light emission period to the light emission period is performed for each row. In the circuit operations shown in FIGS. 10 and 12, transition from the non-light emission period to the light emission period is performed for every rows where the operation in the correction period is executed at the same timing.

In the driving shown in FIG. 13, each of the operation in the correction period and the operation in the write period included in the non-light emission period can be performed in a so-called vertical blanking period. At this time, after the potential of the reference signal Vcal is supplied, the potential of the signal line 310 sequentially changes from the potential of the luminance signal Vsig in the first row to that in the mth row as the final row. By performing such the circuit operation, the change in potential can be smaller than in a case in which the potential of the signal line 310 changes between the potential of the reference signal Vcal and the potential of the luminance signal Vsig for each row or every rows where the operation in the correction period is executed at the same timing. This is because, for one video (image), the luminance often changes gradually in a plane, and the change in potential of the luminance signal Vsig between the adjacent rows is often small. Accordingly, it is possible to further suppress the amount (number of times) of charge/discharge of the signal line 310 as compared to the circuit operations shown in FIGS. 10 to 12. As a result, the driving speed of the light emitting device 100 can be further increased, and the power consumption of the driving power thereof can be further reduced.

Also in the operation shown in FIG. 13, as in the operation shown in FIG. 10, the time difference (pn2−p12) between (1) the time p12 from the timing when the light emission control transistor 124 is rendered conductive in the pixel 101 arranged in the first row after the end of the correction period to the start of the write period in the pixel 101 arranged in the first row and (2) a time pn2 from the timing when the light emission control transistor 124 is rendered conductive in the pixel 101 arranged in the nth row after the end of the correction period to the start of the write period in the pixel 101 arranged in the nth row is shorter than the time difference (pn1−p11) between (1) a time p11 from the end of the correction period to the start of the write period in the pixel 101 arranged in the first row and (2) a time pn1 from the end of the correction period to the start of the write period in the pixel 101 arranged in the nth row. That is, the difference, between the rows, in time from the timing when the light emission control transistor 124 returns to the non-conductive state to the start of the write period becomes smaller than the difference, between the rows, in time from the end of the correction period to the start of the write period. Thus, the influence of a small leak current for each row with respect to the source potential Vs of the driving transistor 122 can be reduced. That is, also in the circuit operation shown in FIG. 13, as in the circuit operation shown in FIG. 10, it is possible to suppress occurrence of periodic streaks or shading in a video (image) displayed on the light emitting device 100, and deterioration in image quality can be suppressed.

For example, the time p12 from the timing when the light emission control transistor 124 is rendered conductive in the pixel 101 arranged in the first row after the end of the correction period to the start of the write period in the pixel 101 arranged in the first row may be equal to the time pn2 from the timing when the light emission control transistor 124 is rendered conductive in the pixel 101 arranged in the nth row after the end of the correction period to the start of the write period in the pixel 101 arranged in the nth row. Further, for example, the time pn2 from the timing when the light emission control transistor 124 is rendered conductive in the pixel 101 arranged in the nth row after the end of the correction period to the start of the write period in the pixel 101 arranged in the nth row may be equal to a time pq2 from the timing when the light emission control transistor 124 is rendered conductive in the pixel 101 arranged in the qth row (here, q satisfies q≠n and 1≤q≤m) after the end of the correction period to the start of the write period in the pixel 101 arranged in the qth row.

Next, the write scanning circuit 201 that controls conduction of the write transistor 123 in this embodiment will be described. The write scanning circuit 201 can use the arrangement similar to the above-described arrangement shown in FIG. 11A to implement the circuit operation shown in FIG. 13. On the other hand, as the write scanning circuit 201, a circuit as described below may be used. The circuit arrangement described below can be used for the circuit operation shown in FIG. 10, like the above-described circuit arrangement shown in FIG. 11A.

Figure 14A:
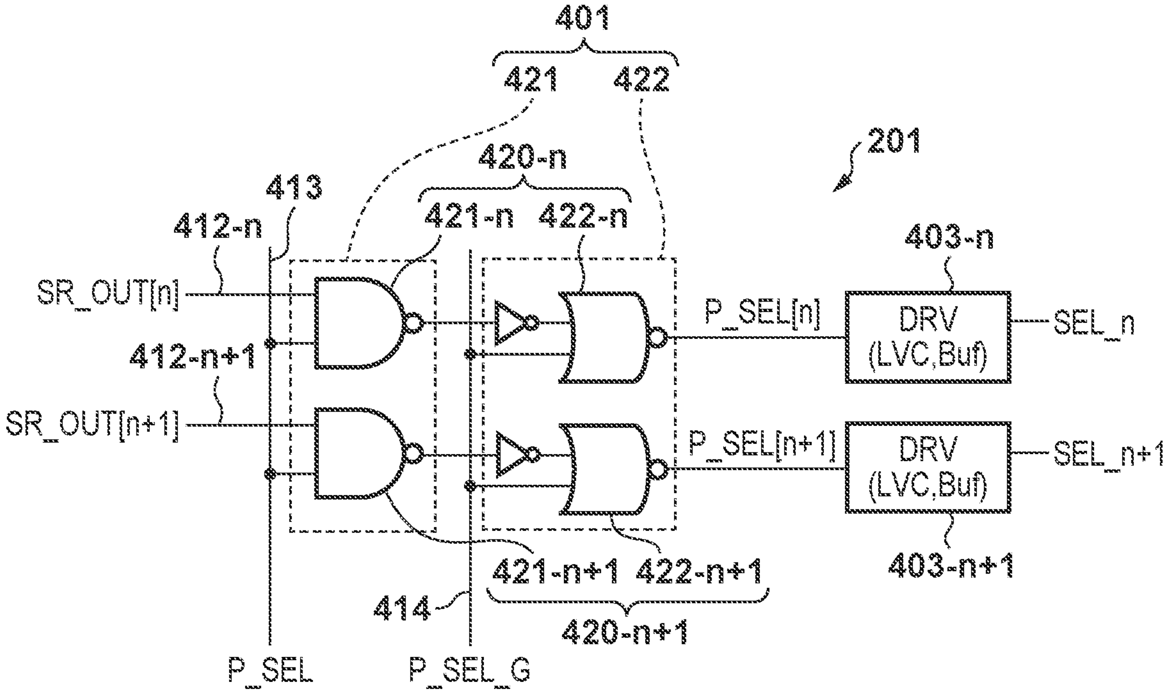
FIG. 14A is a view showing an example of the arrangement of the scanning circuit of the light emitting device shown in FIG. 1.

FIG. 14A shows an example of the arrangement of the write scanning circuit 201 for driving the pixel 101 arranged the nth row and the pixel 101 arranged in the (n+1)th row. As shown in FIG. 14A, the write scanning circuit 201 includes the logic circuit unit 401. The logic circuit unit 401 includes a circuit 420-*n* for supplying a signal instructing conduction of the write transistor 123 of the pixel 101 arranged in the nth row, and a circuit 420-*n*+1 for supplying a signal instructing conduction of the write transistor 123 of the pixel 101 arranged in the (n+1)th row.

As shown in FIG. 14A, the circuits 420-*n* and 420-*n*+1 of the logic circuit unit 401 include partial circuits 421-*n* and 421-*n*+1, respectively, each of which controls conduction of the write transistor 123 in the write period. Each of the partial circuits 421-*n* and 421-*n*+1 is formed by including, for example, a NAND circuit. The partial circuit 421-*n* of the circuit 420-*n* and the partial circuit 421-*n*+1 of the circuit 420-*n*+1 are commonly connected to a control line 413 out of a plurality of control lines 412 to 414 supplied with signals for controlling the write transistor 123. For example, the signal P_SEL is input to the control line 411 from a control circuit (not shown) that controls the light emitting device 100.

Figure 14B:
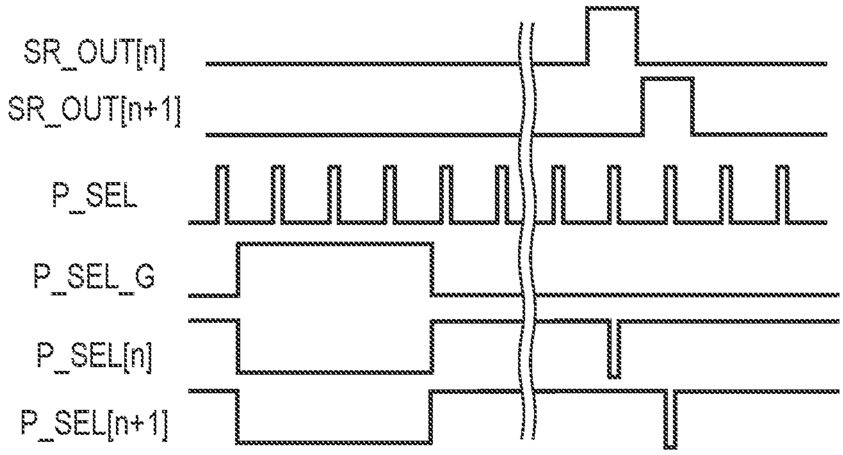
FIG. 14B is a view showing an example of input/output pulses of the scanning circuit of the light emitting device shown in FIG. 1.

Out of the control lines 412, the control lines 412-*n* and 412-*n*+1 different from each other are connected to the partial circuit 421-*n* of the circuit 420-*n* and the partial circuit 421-*n*+1 of the circuit 420-*n*+1, respectively. For example, the signals SR_OUT[n] and SR_OUT[n+1] are supplied to the control lines 412-*n* and 412-*n*+1, respectively, from a shift register arranged in a control circuit (not shown) that controls the light emitting device 100, or the like. As shown in FIG. 14B to be described later, the signals SR_OUT[n] and SR_OUT[n+1] are signals for allowing output of a signal instructing conduction of the write transistor 123 from the partial circuits 421-*n* and the 421-*n*+1, respectively.

As shown in FIG. 14A, the circuits 420-*n* and 420-*n*+1 of the logic circuit unit 401 further include partial circuits 422-*n* and 422-*n*+1, respectively, for controlling conduction of the write transistor 123 in the correction period. Each of the partial circuits 422-*n* and 422-*n*+1 is formed by including, for example, an inverter and a NOR circuit. An output of each of the partial circuits 421-*n* and 421-*n*+1 is input to the NOR circuit via the inverter in each of the partial circuits 422-*n* and 422-*n*+1. The NOR circuits of the partial circuits 422-*n* and 422-*n*+1 are commonly connected to the control line 414 out of the plurality of control lines 412 to 414 supplied with signals for controlling the write transistor. For example, a signal P_SEL_G is input to the control line 414 from a shift register arranged in a control circuit (not shown) that controls the light emitting device 100, or the like.

FIG. 14B shows the signals SR_OUT[n], SR_OUT[n+1], P_SEL, and P_SEL_G input to the logic circuit unit 401 of the write scanning circuit 201, and the signals P_SEL[n] and P_SEL[n+1] output from the logic circuit unit 401. As has been described above, each of the partial circuits 421-*n* and 421-*n*+1 controls conduction of the write transistor 123 during the write period. Hence, the signal P_SEL supplied from the control line 413 to the partial circuits 421-*n* and 421-*n*+1 is a pulse for writing the luminance signal Vsig in the pixel 101 (the control terminal of the driving transistor 122) in the respective rows. Further, as has been described above, each of the partial circuits 422-*n* and 422-*n*+1 controls conduction of the write transistor 123 in the correction period. Hence, the signal P_SEL_G supplied from the control line 414 to the partial circuits 422-*n* and 422-*n*+1 is a pulse for writing the reference signal Vcal in the pixel (the control terminal of the driving transistor 122). Here, as shown in FIG. 14B, the cycle at which the signal (the signal P_SEL in the active state) instructing conduction of the write transistor 123 is supplied to the control line 413 is shorter than the cycle at which the signal (the signal P_SEL_G in the active state) instructing conduction of the write transistor 123 is supplied to the control line 414.

For example, as in the arrangement shown in FIG. 11B, the signals P_SEL[n] and P_SEL[n+1] output from the logic circuit unit 401 are input to the driver circuits 403 arranged in the write scanning circuit 201, each of which includes a level shifter, a buffer, and the like. The driver circuits 403 supply the above-described write scanning signals SEL_n and SEL_n+1 corresponding to the input signals P_SEL[n] and P_SEL[n+1] to the pixels 101 arranged in the corresponding rows of the pixel array 110 via the signal lines 310.

Figure 15:
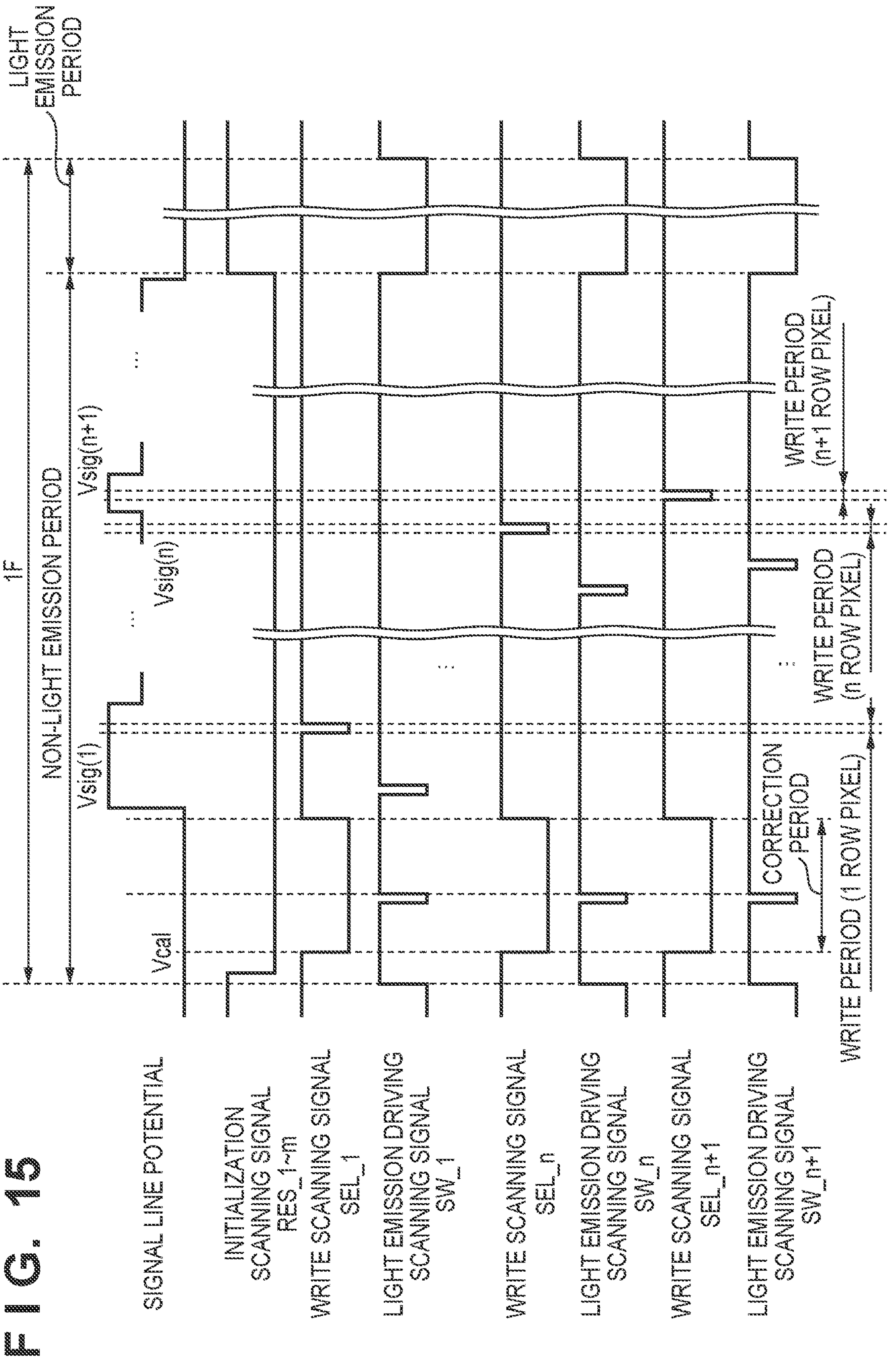
FIG. 15 is a timing chart showing an example of the operation of the light emitting device shown in FIG. 1.

Also in this embodiment, as shown in FIG. 6, the additional capacitive element 126 may be arranged between the capacitive element 125 and the supply line 134. Further, as shown in FIGS. 7 and 8, the reset transistor 127 that resets, to the potential VSS, the terminal (anode electrode) connected to the driving transistor 122 out of the two terminals of the light emitting element 121 may be included. In this case, as shown in FIG. 15, the timing of the initialization scanning signal RES for rendering the reset transistor 127 conductive may be common to all rows arranged in the pixel array 110. The above-described effect of the additional capacitive element 126 and the above-described effect of the reset transistor 127 can be respectively obtained. A combination of the additional capacitive element 126 and the reset transistor 127 may be used.

In the embodiment described above, the organic EL element has been exemplified as the light emitting element 121 arranged in the pixel 101. However, the light emitting element 121 is not limited to the organic EL element. For example, an inorganic EL element, an LED element, a semiconductor laser element, or the like may be used for the light emitting element 121. That is, this disclosure can be applied to the general light emitting device using a current-driven electro-optical element (light emitting element) whose light emission luminance changes in accordance with the value of a current flowing through the element.

Here, application examples in which the light emitting device 100 according to this embodiment is applied to an image forming device, a display device, a photoelectric conversion device, an electronic apparatus, an illumination device, a moving body, and a wearable device will be described here with reference to FIGS. 16A to 21B. The description will be given assuming that a light emitting element, for example, an organic light emitting element such as an organic EL element is arranged in the pixel 101 arranged in the pixel array 110 of the light emitting device 100 as has been described above. Details of each component arranged in the pixel array 110 of the light emitting device 100 described above will be described first, and the application examples will be described after that.

Arrangement of Organic Light Emitting Element

The organic light emitting element is provided by forming an insulating layer, a first electrode, an organic compound layer, and a second electrode on a substrate. A protection layer, a color filter, a microlens, and the like may be provided on a cathode. If a color filter is provided, a planarizing layer may be provided between the protection layer and the color filter. The planarizing layer can be formed using acrylic resin or the like. The same applies to a case in which a planarizing layer is provided between the color filter and the microlens.

Substrate

Quartz, glass, a silicon wafer, a resin, a metal, or the like may be used as a substrate. Furthermore, a switching element such as a transistor, a wiring pattern, and the like may be provided on the substrate, and an insulating layer may be provided thereon. The insulating layer may be made of any material as long as a contact hole can be formed so that the wiring pattern can be formed between the first electrode and the substrate and insulation from the unconnected wiring pattern can be ensured. For example, a resin such as polyimide, silicon oxide, silicon nitride, or the like may be used for the insulating layer.

Electrode

A pair of electrodes can be used as the electrodes. The pair of electrodes can be an anode and a cathode. If an electric field is applied in the direction in which the organic light emitting element emits light, the electrode having a high potential is the anode, and the other is the cathode. It can also be said that the electrode that supplies holes to the light emitting layer is the anode and the electrode that supplies electrons is the cathode.

As the constituent material of the anode, a material having a large work function may be selected. For example, a metal such as gold, platinum, silver, copper, nickel, palladium, cobalt, selenium, vanadium, or tungsten, a mixture containing some of them, an alloy obtained by combining some of them, or a metal oxide such as tin oxide, zinc oxide, indium oxide, indium tin oxide (ITO), or zinc indium oxide can be used. Furthermore, a conductive polymer such as polyaniline, polypyrrole, or polythiophene can also be used as the constituent material of the anode.

One of these electrode materials may be used singly, or two or more of them may be used in combination. The anode may be formed by a single layer or a plurality of layers.

If the electrode is used as a reflective electrode, for example, chromium, aluminum, silver, titanium, tungsten, molybdenum, an alloy thereof, a stacked layer thereof, or the like can be used. The above materials can function as a reflective film having no role as an electrode. If a transparent electrode is used as the electrode, an oxide transparent conductive layer made of indium tin oxide (ITO), indium zinc oxide, or the like can be used, but the present invention is not limited thereto. A photolithography technique can be used to form the electrode.

On the other hand, as the constituent material of the cathode, a material having a small work function may be selected. Examples of the material include an alkali metal such as lithium, an alkaline earth metal such as calcium, a metal such as aluminum, titanium, manganese, silver, lead, or chromium, and a mixture containing some of them. Alternatively, an alloy obtained by combining these metals can also be used. For example, a magnesium-silver alloy, an aluminum-lithium alloy, an aluminum-magnesium alloy, a silver-copper alloy, a zinc-silver alloy, or the like can be used. A metal oxide such as indium tin oxide (ITO) can also be used. One of these electrode materials may be used singly, or two or more of them may be used in combination. The cathode may have a single-layer structure or a multi-layer structure. Silver may be used as the cathode. To suppress aggregation of silver, a silver alloy may be used. The ratio of the alloy is not limited as long as aggregation of silver can be suppressed. For example, the ratio between silver and another metal may be 1:1, 3:1, or the like.

The cathode may be a top emission element using an oxide conductive layer made of ITO or the like, or may be a bottom emission element using a reflective electrode made of aluminum (Al) or the like, and is not particularly limited. The method of forming the cathode is not particularly limited, but if direct current sputtering or alternating current sputtering is used, the good coverage is achieved for the film to be formed, and the resistance of the cathode can be lowered.

Pixel Separation Layer

A pixel separation layer may be formed by a so-called silicon oxide, such as silicon nitride (SiN), silicon oxynitride (SiON), or silicon oxide (SiO), formed using a Chemical Vapor Deposition (CVD) method. To increase the resistance in the in-plane direction of the organic compound layer, the organic compound layer, especially the hole transport layer may be thinly deposited on the side wall of the pixel separation layer. More specifically, the organic compound layer can be deposited so as to have a thin film thickness on the side wall by increasing the taper angle of the side wall of the pixel separation layer or the film thickness of the pixel separation layer to increase vignetting during vapor deposition.

On the other hand, the taper angle of the side wall of the pixel separation layer or the film thickness of the pixel separation layer can be adjusted to the extent that no space is formed in the protection layer formed on the pixel separation layer. Since no space is formed in the protection layer, it is possible to reduce generation of defects in the protection layer. Since generation of detects in the protection layer is reduced, a decrease in reliability caused by generation of a dark spot or occurrence of a conductive failure of the second electrode can be reduced.

According to this embodiment, even if the taper angle of the side wall of the pixel separation layer is not acute, it is possible to effectively suppress leakage of charges to an adjacent pixel. As a result of this consideration, it has been found that the taper angle of 60° (inclusive) to 90° (inclusive) can sufficiently reduce the occurrence of defects. The film thickness of the pixel separation layer may be 10 nm (inclusive) to 150 nm (inclusive). A similar effect can be obtained in an arrangement including only pixel electrodes without the pixel separation layer. However, in this case, the film thickness of the pixel electrode is set to be equal to or smaller than half the film thickness of the organic layer or the end portion of the pixel electrode is formed to have a forward tapered shape of less than 60°. With this, short circuit of the organic light emitting element can be reduced.

Furthermore, in a case where the first electrode is the cathode and the second electrode is the anode, a high color gamut and low-voltage driving can be achieved by forming the electron transport material and charge transport layer and forming the light emitting layer on the charge transport layer.

Organic Compound Layer

The organic compound layer may be formed by a single layer or a plurality of layers. If the organic compound layer includes a plurality of layers, the layers can be called a hole injection layer, a hole transport layer, an electron blocking layer, a light emitting layer, a hole blocking layer, an electron transport layer, and an electron injection layer in accordance with the functions of the layers. The organic compound layer is mainly formed from an organic compound but may contain inorganic atoms and an inorganic compound. For example, the organic compound layer may contain copper, lithium, magnesium, aluminum, iridium, platinum, molybdenum, zinc, or the like. The organic compound layer may be arranged between the first and second electrodes, and may be arranged in contact with the first and second electrodes.

Protection Layer

A protection layer may be provided on the cathode. For example, by adhering glass provided with a moisture absorbing agent on the cathode, permeation of water or the like into the organic compound layer can be suppressed and occurrence of display defects can be suppressed. Furthermore, as another embodiment, a passivation layer made of silicon nitride or the like may be provided on the cathode to suppress permeation of water or the like into the organic compound layer. For example, the protection layer can be formed by forming the cathode, transferring it to another chamber without breaking the vacuum, and forming silicon nitride having a thickness of 2 μm by the CVD method. The protection layer may be provided using an atomic deposition (ALD) method after deposition of the protection layer using the CVD method. The material of the protection layer by the ALD method is not limited but can be silicon nitride, silicon oxide, aluminum oxide, or the like. Silicon nitride may further be formed by the CVD method on the protection layer formed by the ALD method. The protection layer formed by the ALD method may have a film thickness smaller than that of the protection layer formed by the CVD method. More specifically, the film thickness of the protection layer formed by the ALD method may be 50% or less, or 10% or less of that of the protection layer formed by the CVD method.

Color Filter

A color filter may be provided on the protection layer. For example, a color filter considering the size of the organic light emitting element may be provided on another substrate, and the substrate with the color filter formed thereon may be bonded to the substrate with the organic light emitting element provided thereon. Alternatively, for example, a color filter may be patterned on the above-described protection layer using a photolithography technique. The color filter may be formed from a polymeric material.

Planarizing Layer

A planarizing layer may be arranged between the color filter and the protection layer. The planarizing layer is provided to reduce unevenness of the layer below the planarizing layer. The planarizing layer may be called a material resin layer without limiting the purpose of the layer. The planarizing layer may be formed from an organic compound, and may be made of a low-molecular material or a polymeric material. In consideration of reduction of unevenness, a polymeric organic compound may be used for the planarizing layer.

The planarizing layers may be provided above and below the color filter. In that case, the same or different constituent materials may be used for these planarizing layers. More specifically, examples of the material of the planarizing layer include polyvinyl carbazole resin, polycarbonate resin, polyester resin, ABS resin, acrylic resin, polyimide resin, phenol resin, epoxy resin, silicone resin, and urea resin.

Microlens

The organic light emitting device may include an optical member such as a microlens on the light emission side. The microlens can be made of acrylic resin, epoxy resin, or the like. The microlens can aim to increase the amount of light extracted from the organic light emitting device and control the direction of light to be extracted. The microlens can have a hemispherical shape. If the microlens has a hemispherical shape, among tangents contacting the hemisphere, there is a tangent parallel to the insulating layer, and the contact between the tangent and the hemisphere is the vertex of the microlens. The vertex of the microlens can be decided in the same manner even in an arbitrary sectional view. That is, among tangents contacting the semicircle of the microlens in a sectional view, there is a tangent parallel to the insulating layer, and the contact between the tangent and the semicircle is the vertex of the microlens.

Furthermore, the middle point of the microlens can also be defined. In the section of the microlens, a line segment from a point at which an arc shape ends to a point at which another arc shape ends is assumed, and the middle point of the line segment can be called the middle point of the microlens. A section for determining the vertex and the middle point may be a section perpendicular to the insulating layer.

The microlens includes a first surface including a convex portion and a second surface opposite to the first surface. The second surface can be arranged on the functional layer (light emitting layer) side of the first surface. For this arrangement, the microlens needs to be formed on the light emitting device. If the functional layer is an organic layer, a process which produces high temperature in the manufacturing step of the microlens may be avoided. In addition, if it is configured to arrange the second surface on the functional layer side of the first surface, all the glass transition temperatures of an organic compound forming the organic layer may be 100° C. or more. For example, 130° C. or more is suitable.

Counter Substrate

A counter substrate may be arranged on the planarizing layer. The counter substrate is called a counter substrate because it is provided at a position corresponding to the above-described substrate. The constituent material of the counter substrate can be the same as that of the above-described substrate. If the above-described substrate is the first substrate, the counter substrate can be the second substrate.

Organic Layer

The organic compound layer (hole injection layer, hole transport layer, electron blocking layer, light emitting layer, hole blocking layer, electron transport layer, electron injection layer, and the like) forming the organic light emitting element according to an embodiment of the present disclosure may be formed by the method to be described below.

The organic compound layer forming the organic light emitting element according to the embodiment of the present disclosure can be formed by a dry process using a vacuum deposition method, an ionization deposition method, a sputtering method, a plasma method, or the like. Instead of the dry process, a wet process that forms a layer by dissolving a solute in an appropriate solvent and using a well-known coating method (for example, a spin coating method, a dipping method, a casting method, an LB method, an inkjet method, or the like) can be used.

Here, when the layer is formed by a vacuum deposition method, a solution coating method, or the like, crystallization or the like hardly occurs and excellent temporal stability is obtained. Furthermore, when the layer is formed using a coating method, it is possible to form the film in combination with a suitable binder resin.

Examples of the binder resin include polyvinyl carbazole resin, polycarbonate resin, polyester resin, ABS resin, acrylic resin, polyimide resin, phenol resin, epoxy resin, silicone resin, and urea resin. However, the binder resin is not limited to them.

One of these binder resins may be used singly as a homopolymer or a copolymer, or two or more of them may be used in combination. Furthermore, additives such as a well-known plasticizer, antioxidant, and an ultraviolet absorber may also be used as needed.

Pixel Circuit

The light emitting device can include a pixel circuit connected to the light emitting element. The pixel circuit may be an active matrix circuit that individually controls light emission of the first and second light emitting elements. The active matrix circuit may be a voltage or current programing circuit. A driving circuit includes a pixel circuit for each pixel. The pixel circuit can include a light emitting element, a transistor for controlling light emission luminance of the light emitting element, a transistor for controlling a light emission timing, a capacitor for holding the gate voltage of the transistor for controlling the light emission luminance, and a transistor for connection to GND without intervention of the light emitting element.

The light emitting device includes a display region and a peripheral region arranged around the display region. The light emitting device includes the pixel circuit in the display region and a display control circuit in the peripheral region. The mobility of the transistor forming the pixel circuit may be smaller than that of a transistor forming the display control circuit.

The slope of the current-voltage characteristic of the transistor forming the pixel circuit may be smaller than that of the current-voltage characteristic of the transistor forming the display control circuit. The slope of the current-voltage characteristic can be measured by a so-called Vg-Ig characteristic.

The transistor forming the pixel circuit is a transistor connected to the light emitting element such as the first light emitting element.

Pixel

The organic light emitting device includes a plurality of pixels. Each pixel includes sub-pixels that emit light components of different colors. The sub-pixels may include, for example, R, G, and B emission colors, respectively.

In each pixel, a region also called a pixel opening emits light. The pixel opening can have a size of 5 μm (inclusive) to 15 μm (inclusive). More specifically, the pixel opening can have a size of 11 μm, 9.5 μm, 7.4 μm, 6.4 μm, or the like.

A distance between the sub-pixels can be 10 μm or less, and can be, more specifically, 8 μm, 7.4 μm, or 6.4 μm.

The pixels can have a known arrangement form in a plan view. For example, the pixels may have a stripe arrangement, a delta arrangement, a pentile arrangement, or a Bayer arrangement. The shape of each sub-pixel in a plan view may be any known shape. For example, a quadrangle such as a rectangle or a rhombus, a hexagon, or the like may be possible. A shape which is not a correct shape but is close to a rectangle is included in a rectangle, as a matter of course. The shape of the sub-pixel and the pixel arrangement can be used in combination.

Application of Organic Light Emitting Element of Embodiment of Present Disclosure The organic light emitting element according to an embodiment of the present disclosure can be used as a constituent member of a display device or an illumination device. In addition, the organic light emitting element is applicable to the exposure light source of an electrophotographic image forming device, the backlight of a liquid crystal display device, a light emitting device including a color filter in a white light source, and the like.

The display device may be an image information processing device that includes an image input unit for inputting image information from an area CCD, a linear CCD, a memory card, or the like, and an information processing unit for processing the input information, and displays the input image on a display unit.

In addition, a display unit included in an image capturing device or an inkjet printer can have a touch panel function. The driving type of the touch panel function may be an infrared type, a capacitance type, a resistive film type, or an electromagnetic induction type, and is not particularly limited. The display device may be used for the display unit of a multifunction printer.

Figure 16A:
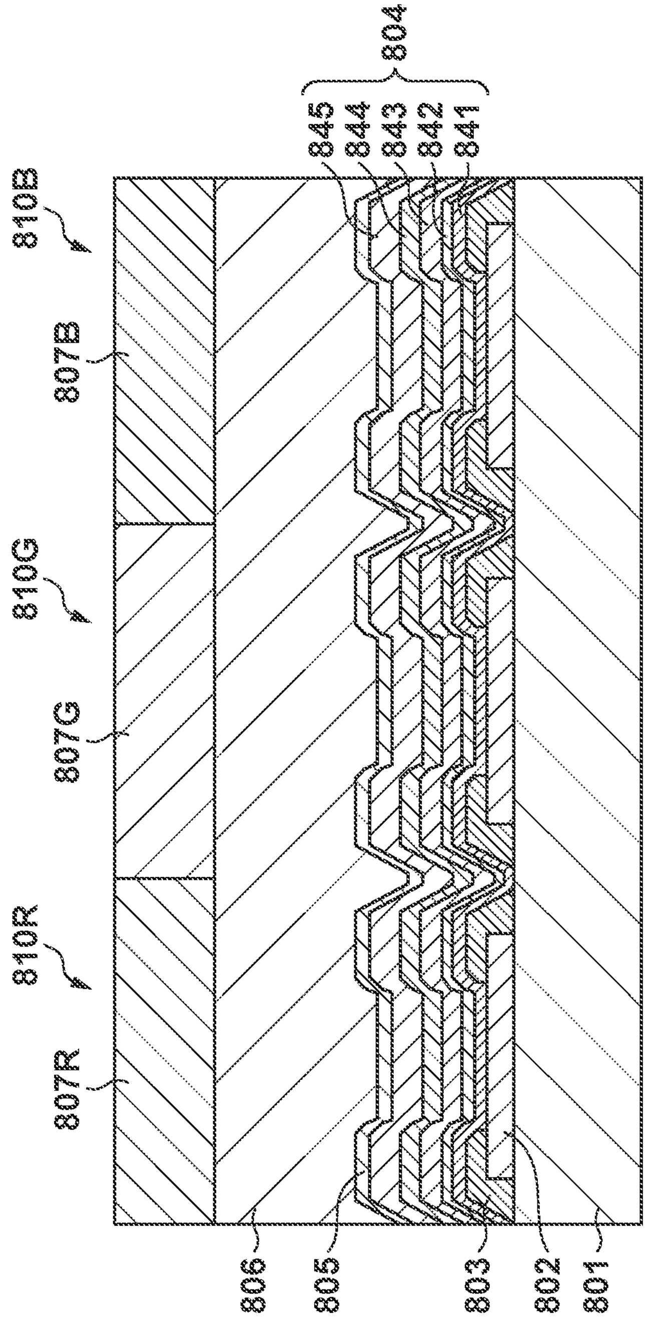
FIGS. 16A and 16B are sectional views showing an example of the arrangement of the pixel of the light emitting device shown in FIG. 1.

More details will be described next with reference to the accompanying drawings. FIG. 16A shows an example of a pixel (pixel 101) as a constituent element of the above-described pixel array 110. The pixel includes sub-pixels 810. The sub-pixels are divided into sub-pixels 810R, 810G, and 810B by emitted light components. The light emission colors may be discriminated by the wavelengths of light components emitted from the light emitting layers, or light emitted from each sub-pixel may be selectively transmitted or undergo color conversion by a color filter or the like. Each sub-pixel includes a reflective electrode 802 as the first electrode on an interlayer insulating layer 801, an insulating layer 803 covering the end of the reflective electrode 802, an organic compound layer 804 covering the first electrode and the insulating layer, a transparent electrode 805 as the second electrode, a protection layer 806, and a color filter 807.

The interlayer insulating layer 801 can include a transistor and a capacitive element arranged in the interlayer insulating layer 801 or a layer below it. The transistor and the first electrode can electrically be connected via a contact hole (not shown) or the like.

The insulating layer 803 can also be called a bank or a pixel separation film. The insulating layer 803 covers the end of the first electrode, and is arranged to surround the first electrode. A portion of the first electrode where no insulating layer 803 is arranged is in contact with the organic compound layer 804 to form a light emitting region.

The organic compound layer 804 includes a hole injection layer 841, a hole transport layer 842, a first light emitting layer 843, a second light emitting layer 844, and an electron transport layer 845.

The second electrode may be a transparent electrode, a reflective electrode, or a semi-transmissive electrode.

The protection layer 806 suppresses permeation of water into the organic compound layer. The protection layer is shown as a single layer but may include a plurality of layers. Each layer can be an inorganic compound layer or an organic compound layer.

The color filter 807 is divided into color filters 807R, 807G, and 807B by colors. The color filters can be formed on a planarizing film (not shown). A resin protection layer (not shown) may be arranged on the color filters. The color filters can be formed on the protection layer 806. Alternatively, the color filters can be provided on the counter substrate such as a glass substrate, and then the substrate may be bonded.

Figure 16B:
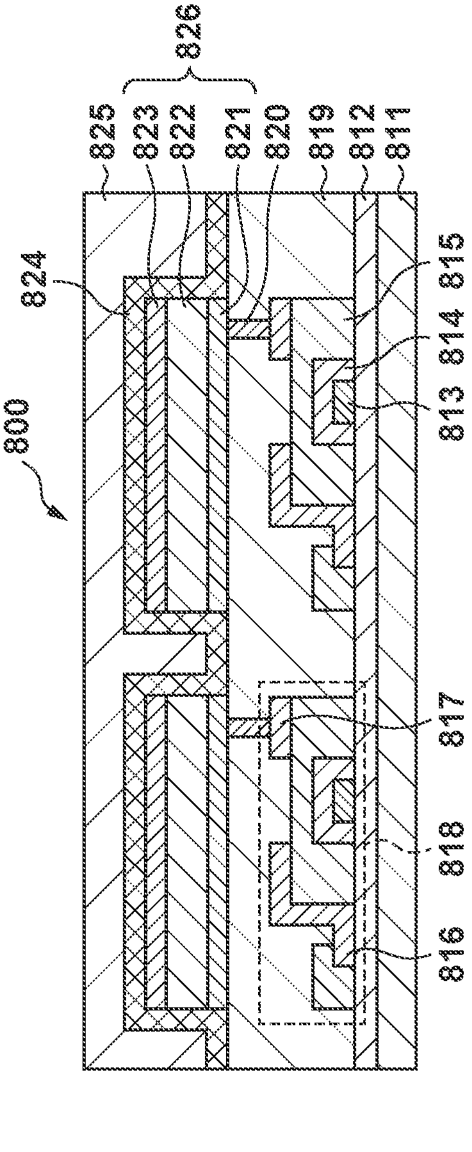

A display device 800 (corresponding to the above-described light emitting device 100) shown in FIG. 16B is provided with an organic light emitting element 826 and a TFT 818 as an example of a transistor. A substrate 811 of glass, silicon, or the like is provided and an insulating layer 812 is provided on the substrate 811. The active element such as the TFT 818 is arranged on the insulating layer, and a gate electrode 813, a gate insulating film 814, and a semiconductor layer 815 of the active element are arranged. The TFT 818 further includes the semiconductor layer 815, a drain electrode 816, and a source electrode 817. An insulating film 819 is provided on the TFT 818. The source electrode 817 and an anode 821 forming the organic light emitting element 826 are connected via a contact hole 820 formed in the insulating film.

A method of electrically connecting the electrodes (anode and cathode) included in the organic light emitting element 826 and the electrodes (source electrode and drain electrode) included in the TFT is not limited to that shown in FIG. 16B. That is, one of the anode and cathode and one of the source electrode and drain electrode of the TFT are electrically connected. The TFT indicates a thin-film transistor.

In the display device 800 shown in FIG. 16B, an organic compound layer is illustrated as one layer. However, an organic compound layer 822 may include a plurality of layers. A first protection layer 824 and a second protection layer 825 are provided on a cathode 823 to suppress deterioration of the organic light emitting element.

A transistor is used as a switching element in the display device 800 shown in FIG. 16B but may be used as another switching element.

The transistor used in the display device 800 shown in FIG. 16B is not limited to a transistor using a single-crystal silicon wafer, and may be a thin-film transistor including an active layer on an insulating surface of a substrate. Examples of the active layer include single-crystal silicon, amorphous silicon, non-single-crystal silicon such as microcrystalline silicon, and a non-single-crystal oxide semiconductor such as indium zinc oxide and indium gallium zinc oxide. Note that a thin-film transistor is also called a TFT element.

The transistor included in the display device 800 shown in FIG. 16B may be formed in the substrate such as a silicon substrate. Forming the transistor in the substrate means forming the transistor by processing the substrate such as a silicon substrate. That is, when the transistor is included in the substrate, it can be considered that the substrate and the transistor are formed integrally.

The light emission luminance of the organic light emitting element according to this embodiment can be controlled by the TFT which is an example of a switching element, and the plurality of organic light emitting elements can be provided in a plane to display an image with the light emission luminances of the respective elements. Here, the switching element according to this embodiment is not limited to the TFT, and may be a transistor formed from low-temperature polysilicon or an active matrix driver formed on the substrate such as a silicon substrate. The term "on the substrate" may mean "in the substrate". Whether to provide a transistor in the substrate or use a TFT is selected based on the size of the display unit. For example, if the size is about 0.5 inch, the organic light emitting element may be provided on the silicon substrate.

Figure 17:
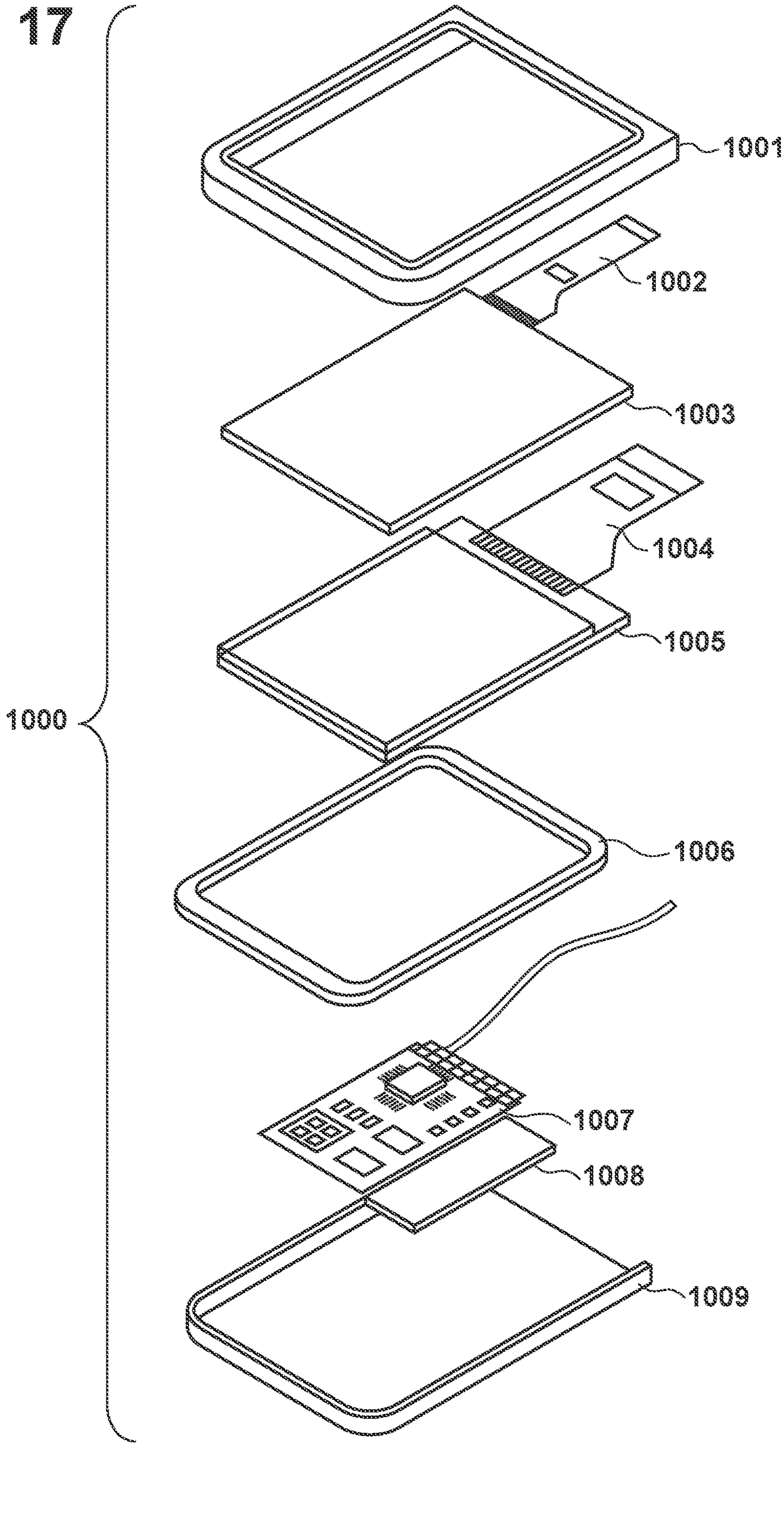
FIG. 17 is a view showing an example of a display device using the light emitting device according to the embodiment.

FIG. 17 is a schematic view showing an example of the display device using the light emitting device 100 of this embodiment. A display device 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005. Active elements such as transistors are arranged on the circuit board 1007. The battery 1008 is unnecessary if the display device 1000 is not a portable apparatus. Even when the display device 1000 is a portable apparatus, the battery 1008 need not be provided at this position. The light emitting device 100 can be applied to the display panel 1005. The pixels 101 arranged in the pixel array 110 of the light emitting device 100 functioning as the display panel 1005 operates in a state in which they are connected to the active elements such as transistors arranged on the circuit board 1007.

The display device 1000 shown in FIG. 17 can be used for a display unit of a photoelectric conversion device (also referred to as an image capturing device) including an optical unit having a plurality of lenses, and an image sensor for receiving light having passed through the optical unit and photoelectrically converting the light into an electric signal. The photoelectric conversion device can include a display unit for displaying information acquired by the image sensor. In addition, the display unit can be either a display unit exposed outside the photoelectric conversion device, or a display unit arranged in the finder. The photoelectric conversion device can be a digital camera or a digital video camera.

Figure 18:
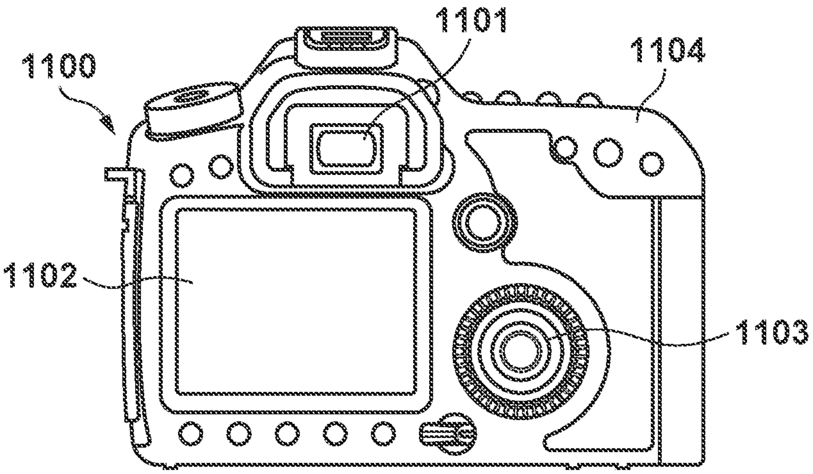
FIG. 18 is a view showing an example of a photoelectric conversion device using the light emitting device according to the embodiment.

FIG. 18 is a schematic view showing an example of the photoelectric conversion device using the light emitting device 100 of this embodiment. A photoelectric conversion device 1100 can include a viewfinder 1101, a rear display 1102, an operation unit 1103, and a housing 1104. The photoelectric conversion device 1100 can also be called an image capturing device. The light emitting device 100 according to this embodiment can be applied to the viewfinder 1101 or the rear display 1102 as a display unit. In this case, the pixel array 110 of the light emitting device 100 can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time in many cases, so the information should be displayed as soon as possible. Therefore, the light emitting device 100 in which the pixel 101 including the light emitting element using the organic light emitting material such as an organic EL element is arranged in the pixel array 110 may be used for the viewfinder 1101 or the rear display 1102. This is so because the organic light emitting material has a high response speed. The light emitting device 100 using the organic light emitting material can be used for the devices that require a high display speed more suitably than for the liquid crystal display device.

The photoelectric conversion device 1100 includes an optical unit (not shown). This optical unit has a plurality of lenses, and forms an image on a photoelectric conversion element (not shown) that receives light having passed through the optical unit and is accommodated in the housing 1104. The focal points of the plurality of lenses can be adjusted by adjusting the relative positions. This operation can also automatically be performed.

The light emitting device 100 may be applied to a display unit of an electronic apparatus. At this time, the display unit can have both a display function and an operation function. Examples of the portable terminal are a portable phone such as a smartphone, a tablet, and a head mounted display.

Figure 19:
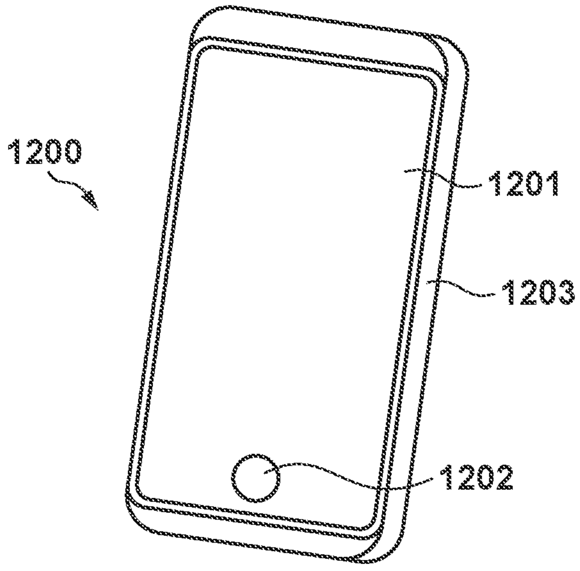
FIG. 19 is a view showing an example of an electronic apparatus using the light emitting device according to the embodiment.

FIG. 19 is a schematic view showing an example of an electronic apparatus using the light emitting device 100 of this embodiment. An electronic apparatus 1200 includes a display unit 1201, an operation unit 1202, and a housing 1203. The housing 1203 can accommodate a circuit, a printed board having this circuit, a battery, and a communication unit. The operation unit 1202 can be a button or a touch-panel-type reaction unit. The operation unit 1202 can also be a biometric authentication unit that performs unlocking or the like by authenticating the fingerprint. The portable apparatus including the communication unit can also be regarded as a communication apparatus. The light emitting device 100 according to this embodiment can be applied to the display unit 1201.

Figure 20A:
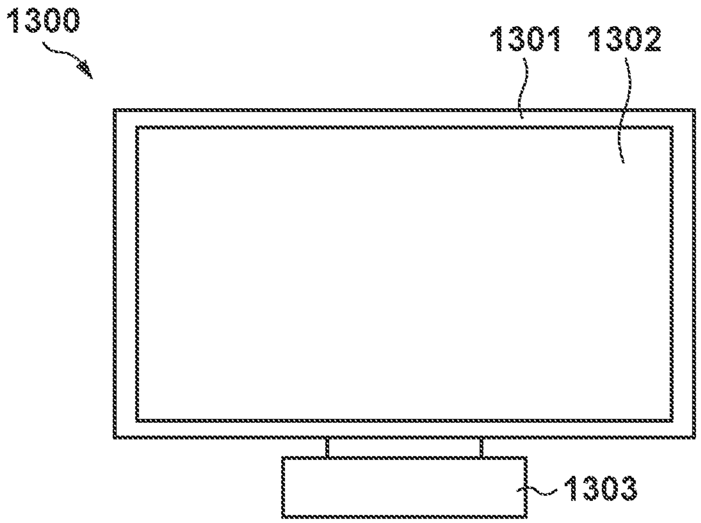
FIGS. 20A and 20B are views each showing an example of a display device using the light emitting device according to the embodiment.
Figure 20B:
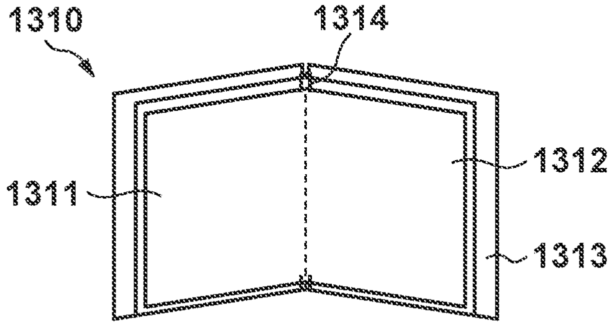

FIGS. 20A and 20B are schematic views showing examples of the display device using the light emitting device 100 of this embodiment. FIG. 20A shows a display device such as a television monitor or a PC monitor. A display device 1300 includes a frame 1301 and a display unit 1302. The light emitting device 100 according to this embodiment can be applied to the display unit 1302. The display device 1300 can include a base 1303 that supports the frame 1301 and the display unit 1302. The base 1303 is not limited to the form shown in FIG. 20A. For example, the lower side of the frame 1301 may also function as the base 1303. In addition, the frame 1301 and the display unit 1302 can be bent. The radius of curvature in this case can be 5,000 mm (inclusive) to 6,000 mm (inclusive).

FIG. 20B is a schematic view showing another example of the display device using the light emitting device 100 of this embodiment. A display device 1310 shown in FIG. 20B can be folded, and is a so-called foldable display device. The display device 1310 includes a first display unit 1311, a second display unit 1312, a housing 1313, and a bending point 1314. The light emitting device 100 according to this embodiment can be applied to each of the first display unit 1311 and the second display unit 1312. The first display unit 1311 and the second display unit 1312 can also be one seamless display device. The first display unit 1311 and the second display unit 1312 can be divided by the bending point. The first display unit 1311 and the second display unit 1312 can display different images, and can also display one image together.

Figure 21A:
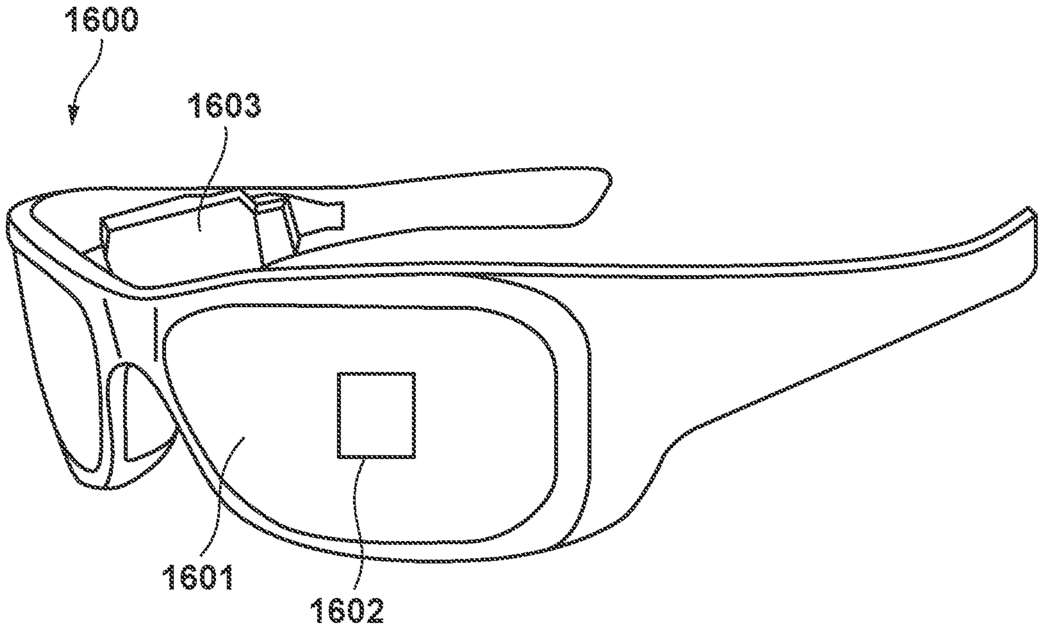
FIGS. 21A and 21B are views each showing an example of a wearable device using the light emitting device according to the embodiment.
Figure 21B:
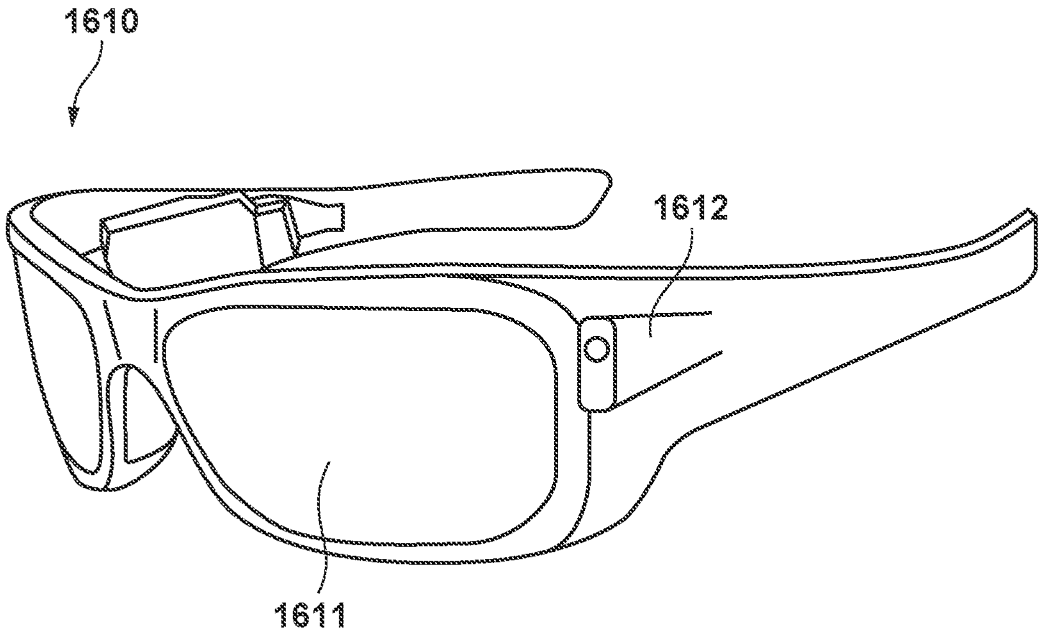

Further application examples of the light emitting device 100 according to this embodiment will be described with reference to FIGS. 21A and 21B. The light emitting device 100 can be applied to a system that can be worn as a wearable device such as smartglasses, a Head Mounted Display (HMD), or a smart contact lens. An image capturing display device used for such application examples includes an image capturing device capable of photoelectrically converting visible light and a light emitting device capable of emitting visible light.

Glasses 1600 (smartglasses) according to one application example will be described with reference to FIG. 21A. An image capturing device 1602 such as a CMOS sensor or an SPAD is provided on the surface side of a lens 1601 of the glasses 1600. In addition, the light emitting device 100 according to this embodiment is provided on the back surface side of the lens 1601.

The glasses 1600 further include a control device 1603. The control device 1603 functions as a power supply that supplies electric power to the image capturing device 1602 and the light emitting device 100 according to each embodiment. In addition, the control device 1603 controls the operations of the image capturing device 1602 and the light emitting device 100. An optical system configured to condense light to the image capturing device 1602 is formed on the lens 1601.

Glasses 1610 (smartglasses) according to one application example will be described with reference to FIG. 21B. The glasses 1610 include a control device 1612, and an image capturing device corresponding to the image capturing device 1602 and the light emitting device 100 are mounted on the control device 1612. The image capturing device in the control device 1612 and an optical system configured to project light emitted from the light emitting device 100 are formed in a lens 1611, and an image is projected to the lens 1611. The control device 1612 functions as a power supply that supplies electric power to the image capturing device and the light emitting device 100, and controls the operations of the image capturing device and the light emitting device 100. The control device 1612 may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The light emitting device 100 according to the embodiment of the present disclosure can include an image capturing device including a light receiving element, and control a displayed image based on the line-of-sight information of the user from the image capturing device.

More specifically, the light emitting device 100 decides a first visual field region at which the user is gazing and a second visual field region other than the first visual field region based on the line-of-sight information. The first visual field region and the second visual field region may be decided by the control device of the light emitting device 100, or those decided by an external control device may be received. In the display region of the light emitting device 100, the display resolution of the first visual field region may be controlled to be higher than the display resolution of the second visual field region. That is, the resolution of the second visual field region may be lower than that of the first visual field region.

In addition, the display region includes a first display region and a second display region different from the first display region, and a region of higher priority is decided from the first display region and the second display region based on line-of-sight information. The first display region and the second display region may be decided by the control device of the light emitting device 100, or those decided by an external control device may be received. The resolution of the region of higher priority may be controlled to be higher than the resolution of the region other than the region of higher priority. That is, the resolution of the region of relatively low priority may be low.

Note that AI may be used to decide the first visual field region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the light emitting device 100, the image capturing device, or an external device. If the external device holds the AI program, it is transmitted to the light emitting device 100 via communication.

When performing display control based on line-of-sight detection, smartglasses further including an image capturing device configured to capture the outside can be applied. The smartglasses can display captured outside information in real time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A light emitting device in which a pixel is arranged, the pixel including (1) a light emitting element, (2) a driving transistor having a first main terminal connected to the light emitting element and configured to supply, to the light emitting element, a current corresponding to a luminance signal, (3) a light emission control transistor arranged between a second main terminal of the driving transistor and a supply line that supplies a first potential and configured to control light emission of the light emitting element, (4) a write transistor arranged between a control terminal of the driving transistor and a signal line to which the luminance signal and a reference signal are supplied, and (5) a capacitive element arranged between the second main terminal and the control terminal, wherein one frame period includes (1) a correction period during which the reference signal is supplied to the signal line, the write transistor is rendered conductive, and the reference signal is written in the control terminal, (2) a write period after the correction period, during which the luminance signal is supplied to the signal line, the write transistor is rendered conductive, and the luminance signal is written in the control terminal, and (3) a light emission period after the write period, during which the light emission control transistor changes from a non-conductive state to a conductive state, and the light emitting element emits light corresponding to the luminance signal, wherein the light emission control transistor is rendered conductive during a conductive state of the write transistor in the correction period, wherein, in a first period after an end of the correction period and before a start of the write period, the light emission control transistor is rendered conductive and then non-conductive from a conductive state, wherein the first period does not include a correction period during which the reference signal is supplied to the signal line, the write transistor is rendered conductive, and the reference signal is written in the control terminal, wherein a plurality of pixels including the pixel are arranged so as to form a plurality of rows, wherein in pixels arranged in at least two rows of the plurality of rows, an operation in the correction period is executed at the same timing, wherein a timing of rendering the light emission control transistor conductive after the end of the correction period and before the start of the write period is different between the pixels arranged in the at least two rows, wherein the pixels arranged in the at least two rows include a pixel arranged in a first row and a pixel arranged in a second row, and wherein a time difference between a time from a timing when the light emission control transistor is rendered conductive in the pixel arranged in the first row after the end of the correction period to the start of the write period in the pixel arranged in the first row and a time from a timing when the light emission control transistor is rendered conductive in the pixel arranged in the second row after the end of the correction period to the start of the write period in the pixel arranged in the second row is shorter than a time difference between a time from the end of the correction period to the start of the write period in the pixel arranged in the first row and a time from the end of the correction period to the start of the write period in the pixel arranged in the second row.

2. The light emitting device according to claim 1, wherein the time from the timing when the light emission control transistor is rendered conductive in the pixel arranged in the first row after the end of the correction period to the start of the write period in the pixel arranged in the first row is equal to the time from the timing when the light emission control transistor is rendered conductive in the pixel arranged in the second row after the end of the correction period to the start of the write period in the pixel arranged in the second row.

3. The light emitting device according to claim 1, wherein in the pixel arranged in the second row, after the end of the correction period, the light emission control transistor is rendered conductive after the end of the write period in the pixel arranged in the first row and before the start of the write period in the pixel arranged in the second row.

4. The light emitting device according to claim 1, wherein the operation in the correction period is executed at the same timing in all rows of the plurality of rows.

5. The light emitting device according to claim 1, further including a write scanning circuit configured to control conduction of the write transistor, wherein the write scanning circuit includes a first circuit configured to supply a signal instructing conduction of the write transistor of the pixel arranged in the first row, and a second circuit configured to supply a signal instructing conduction of the write transistor of the pixel arranged in the second row, wherein the write scanning circuit is connected to a plurality of control lines to which signals for controlling the write transistors are supplied, and wherein different control lines of the plurality of control lines are connected to the first circuit and the second circuit, respectively.

6. The light emitting device according to claim 1, further including a write scanning circuit configured to control conduction of the write transistor, wherein the write scanning circuit includes a first circuit configured to supply a signal instructing conduction of the write transistor of the pixel arranged in the first row, and a second circuit configured to supply a signal instructing conduction of the write transistor of the pixel arranged in the second row, wherein the write scanning circuit is connected to a plurality of control lines to which signals for controlling the write transistors are supplied, wherein each of the first circuit and the second circuit includes a first partial circuit configured to control conduction of the write transistor in the correction period, and a second partial circuit configured to control conduction of the write transistor in the write period, wherein a first control line of the plurality of control lines is commonly connected to the first partial circuit of the first circuit and the first partial circuit of the second circuit, and wherein a second control line of the plurality of control lines is commonly connected to the second partial circuit of the first circuit and the second partial circuit of the second circuit.

7. The light emitting device according to claim 6, wherein a cycle at which the signal instructing conduction of the write transistor is supplied to the second control line is shorter than a cycle at which the signal instructing conduction of the write transistor is supplied to the first control line.

8. The light emitting device according to claim 6, wherein different control lines of the plurality of control lines, to each of which a signal allowing output of a signal instructing conduction of the write transistor from the second partial circuit is supplied, are connected to the second partial circuit of the first circuit and the second partial circuit of the second circuit, respectively.

9. The light emitting device according to claim 1, wherein supply of the luminance signal to the signal line is started before the light emission control transistor is rendered conductive after the end of the correction period and before the start of the write period.

10. The light emitting device according to claim 1, wherein supply of the luminance signal to the signal line is started after the light emission control transistor changes from a conductive state to a non-conductive state after the end of the correction period and before the start of the write period.

11. The light emitting device according to claim 1, wherein a length of a period from a timing when the light emission control transistor changes from a conductive state to a non-conductive state in the correction period to the end of the correction period is longer than a length of a period during which the light emission control transistor is rendered conductive in the correction period.

12. The light emitting device according to claim 1, wherein the first potential is supplied to a back gate terminal of the driving transistor.

13. The light emitting device according to claim 12, wherein the back gate terminal of the driving transistor is connected to the supply line.

14. The light emitting device according to claim 12, wherein the first second main terminal of the driving transistor is a source of the driving transistor.

15. The light emitting device according to claim 1, wherein an additional capacitive element is arranged between the capacitive element and the supply line.

16. The light emitting device according to claim 1, further including a reset transistor configured to reset a terminal, out of two terminals of the light emitting element, connected to the first main terminal to a second potential.

17. The light emitting device according to claim 16, wherein the reset transistor is in a conductive state during a period from the correction period to the write period.

18. The light emitting device according to claim 1, wherein if a potential of the reference signal is Vcal, the first potential is PVDD, and a threshold voltage of the driving transistor is Vth, a relationship expressed by $|Vcal-PVDD|>|Vth|$ is satisfied.

19. The light emitting device according to claim 1, wherein the light emitting element is a current-driven element.

20. A display device comprising the light emitting device according to claim 1, and an active element connected to the light emitting device.

21. A photoelectric conversion device comprising (1) an optical unit including a plurality of lenses, (2) an image sensor configured to receive light having passed through the optical unit, and (3) a display unit configured to display an image, wherein the display unit displays an image captured by the image sensor, and includes the light emitting device according to claim 1.

22. An electronic apparatus comprising (1) a housing provided with a display unit, and (2) a communication unit provided in the housing and configured to perform external communication, wherein the display unit includes the light emitting device according to claim 1.

23. A wearable device comprising a display device configured to display an image, wherein the display device includes the light emitting device according to claim 1.

* * * * *